(12) United States Patent
Haynie et al.

(10) Patent No.: US 9,963,805 B2
(45) Date of Patent: May 8, 2018

(54) POLYPEPTIDE ELECTROSPUN NANOFIBRILS OF DEFINED COMPOSITION

(71) Applicants: University of South Florida, Tampa, FL (US); University of Central Florida Research Foundation, Inc., Orlando, FL (US)

(72) Inventors: Donald T. Haynie, Tampa, FL (US); Lei Zhai, Oviedo, FL (US)

(73) Assignees: University of South Florida, Tampa, FL (US); University of Central Florida Research Foundation, Inc., Orlando, FL (US)

(*) Notice: Subject to any disclaimer, the term of this patent is extended or adjusted under 35 U.S.C. 154(b) by 0 days. days.

(21) Appl. No.: 15/243,423

(22) Filed: Aug. 22, 2016

(65) Prior Publication Data
US 2017/0058432 A1 Mar. 2, 2017

Related U.S. Application Data

(63) Continuation of application No. 13/704,867, filed as application No. PCT/US2011/041253 on Jun. 21, 2011, now Pat. No. 9,428,849.

(60) Provisional application No. 61/356,955, filed on Jun. 21, 2010.

(51) Int. Cl.
| | | |
|---|---|---|
| D01F 6/68 | (2006.01) | |
| D04H 3/016 | (2012.01) | |
| D04H 1/728 | (2012.01) | |
| D01D 5/00 | (2006.01) | |
| C08L 77/04 | (2006.01) | |
| C08G 69/10 | (2006.01) | |

(52) U.S. Cl.
CPC ............ *D01F 6/68* (2013.01); *C08G 69/10* (2013.01); *C08L 77/04* (2013.01); *D01D 5/003* (2013.01); *D01D 5/0007* (2013.01); *D01D 5/0038* (2013.01); *D04H 1/728* (2013.01); *D04H 3/016* (2013.01); *Y10T 428/298* (2015.01)

(58) Field of Classification Search
None
See application file for complete search history.

(56) References Cited

U.S. PATENT DOCUMENTS

| | | |
|---|---|---|
| 6,592,623 B1 | 7/2003 | Bowlin et al. |
| 7,321,022 B2 | 1/2008 | Haynie |
| 7,348,399 B2 | 3/2008 | Haynie |
| 7,411,038 B2 | 8/2008 | Haynie |
| 7,534,860 B2 | 5/2009 | Haynie |
| 7,538,184 B2 | 5/2009 | Haynie |
| 7,544,770 B2 | 6/2009 | Haynie |
| 7,550,557 B2 | 6/2009 | Haynie |
| 7,615,530 B2 | 11/2009 | Haynie |
| 7,662,911 B2 | 2/2010 | Haynie et al. |
| 7,723,294 B2 | 5/2010 | Haynie |
| 7,759,305 B2 | 7/2010 | Haynie |
| 7,781,399 B2 | 8/2010 | Haynie |
| 7,786,076 B2 | 8/2010 | Haynie |
| 7,807,632 B2 | 10/2010 | Haynie |
| 7,807,633 B2 | 10/2010 | Haynie |
| 7,807,634 B2 | 10/2010 | Haynie |
| 2011/0092422 A1 | 4/2011 | Koria et al. |

OTHER PUBLICATIONS

Agarwal, Seema et al., "Use of electrospinning technique for biomedical applications," *Polymer*, 2008, 49:5603-5621.
Chen, Zonggang et al., "Electrospinning of collagen—chitosan complex," *Materials Letters*, 2007, 61:3490-3494.
Dror, Yael et al., "Nanofibers Made of Globular Proteins," *Biomacromolecules*, 2008, 9:2749-2754.
Hadjichristidis, Nikos et al., "Synthesis of Well-Defined Polypeptide-Based Materials via the Ring-Opening Polymerization of α-Amino Acid N-Carboxyanhydrides," *Chem. Rev.*, 2009, 109:5528-5578.
Huang, Lei et al., "Engineered collagen—PEO nanofibers and fabrics," *J. Biomater, Sci. Polymer Edn*, 2001, 12(9):979-993.
Huang, Zheng-Ming et al., "A review on polymer nanofibers by electrospinning and their applications in nanocomposites," *Composites Science and Technology*, 2003, 63:2223-2253.
Huang, Zheng-Ming et al., "Electrospinning and mechanical characterization of gelatin nanofibers," *Polymer*, 2004, 45:5261-5368.
Khadka, Dhan B. et al., "Insoluble Synthetic Polypeptide Mats from Aqueous Solution by Electrospinning," *ACS Applied Materials & Interfaces*, 2010, 2(10):2728-2732.
Maham, Aihui et al., "Protein-Based Nanomedicine Platforms for Drug Delivery," *Small*, 2009, 5(15):1706-1721.
Still, Travis J. et al., "Electrospinning: Applications in drug delivery and tissue engineering," *Biomaterials*, 2008, 29:1989-2006.
Wimley, William C. et al., "Salvation Energies of Amino Acid Side Chains and Backbone in a Family of Host-Guest Pentapeptides," *Biochemistry*, 1996, 35:5109-5124.
Zhang, Yanzhong et al., "Electrospinning of Gelatin Fibers and Gelatin/PCL Composite Fibrous Scaffolds," *Journal of Biomedical Materials Research*, 2005, 72B(1):156-165.
Zhou, Chuncai et al., "High Potency and Broad-Spectrum Antimicrobial Peptides Synthesized via Ring-Opening Polymerization of α-Aminoacid-N-carboxyanhydrides," *Biomacromolecules*, 2010, 11:60-67.
International Search Report in International Application No. PCT/US2011/041253, filed Jun. 21, 2011.
Huang, L. et al. "Generation of Synthetic Elastin-Mimetic Small Diameter Fibers and Fiber Networks" *Macromolecules*, Apr. 18, 2000, 33(8):2989-2997.
Matthews, J.A. et al. "Electrospinning of Collagen Nanofibers" *Biomacromolecules*, Mar. 2002, 3(2):232-238.
Maretschek, S. et al. "Electrospun biodegradable nanofiber nonwovens for controlled release of proteins" *Journal of Controlled Release*, Apr. 21, 2008, 127(2):180-187.

(Continued)

*Primary Examiner* — James H Alstrum-Acevedo
*Assistant Examiner* — Tara L Martinez
(74) *Attorney, Agent, or Firm* — Saliwanchik, Lloyd & Eisenschenk

(57) ABSTRACT

Electrospun nanofibrils and methods of preparing the same are provided. The electrospun nanofibrils comprise at least one polypeptide. A polypeptide can be dissolved in a solution, and the solution can be electrospun into a nanofibril. The solution can be added to a syringe or syringe pump, and an electric field can be applied to electrospin the at least one polypeptide.

14 Claims, 15 Drawing Sheets

(56) References Cited

OTHER PUBLICATIONS

Ohkawa, K. et al. "Synthesis of Collagen-Like Sequential Polypeptides Containing O-Phospho-$_L$-Hydroxyproline and Preparation of Electrospun Composite Fibers for Possible Dental Application" *Macromolecular Bioscience*, Jan. 9, 2009, 9(1):79-92.
Hayashi, S. et al. "Calcium Phosphate Crystallization on Electrospun Cellulose Non-Woven Fabrics Containing Synthetic Phosphorylated Polypeptides" *Macromolecular Materials and Engineering*, May 18, 2009, 294(5):315-322.
Christopherson G.T. et al., "The influence of fiber diameter of electrospun substrates on neural stem differentiation and proliferation," *Biomaterial*, 2009, pp. 556-564, vol. 30.
Bluestein H.G. et al., "Specific Immune Response Genes of the Guinea Pig", *The Journal of Experimental Medicine*, 1971, pp. 458-470, vol. 134.

POLYPEPTIDE ELECTROSPUN NANOFIBRILS OF DEFINED COMPOSITION

CROSS-REFERENCE TO RELATED APPLICATIONS

This application is a continuation of U.S. application Ser. No. 13/704,867, filed Jan. 11, 2013, which is the national stage of international application No. PCT/US2011/041253, filed Jun. 21, 2011, which claims the benefit of U.S. provisional application Ser. No. 61/356,955, filed Jun. 21, 2010, which is herein incorporated by reference in its entirety.

This invention was made with government support W81XWH-07-1-0708 awarded by the Army Medical Research and Material Command. The Government has certain rights in this invention.

BACKGROUND OF THE INVENTION

Polymer fibers have been used in numerous medical applications. For example, sutures can be made of polymer fibers, such as non-biodegradable polymers. Fibers can also be woven or meshed to form wound dressings, tissue engineering matrices, gauzes and bandages, and drug delivery devices. In a drug delivery device, a drug can be encapsulated with the polymer and released by diffusion and/or degradation. These polymeric fibers often have diameters of 50 micros or greater, many in the range of hundreds of microns. They can be limited by the inflexibility of the materials they are formed of.

Nanofibers with diameters in the nanometer to low micron range can also be obtained from polymers. For example, U.S. Pat. No. 7,235,295 discloses such polymeric nanofibers for tissue engineering and drug delivery.

Nanofibrils made of organic polymers are of considerable interest in the scientific community and in industry for a range of technological applications (for example, Huang et al., 2003, Sill and von Recum, 2008), however, each of the existing polymer nanofibrils or nanofibers has limitations. Thus, it is an object of the present invention to provide an improved polymer nanofibril and method of making the same.

BRIEF SUMMARY OF THE INVENTION

The subject invention is drawn to polypeptide electrospun nanofibrils and methods of manufacturing the same.

In one embodiment, the subject invention can include an electrospun nanofibril comprising at least one polypeptide.

In another embodiment, the subject invention can include a method of preparing an electrospun nanofibril, comprising: dissolving a polypeptide in a solvent to form a solution; and electrospinning the solution to form the electrospun nanofibril.

BRIEF DESCRIPTION OF THE SEQUENCES

Figure 1:
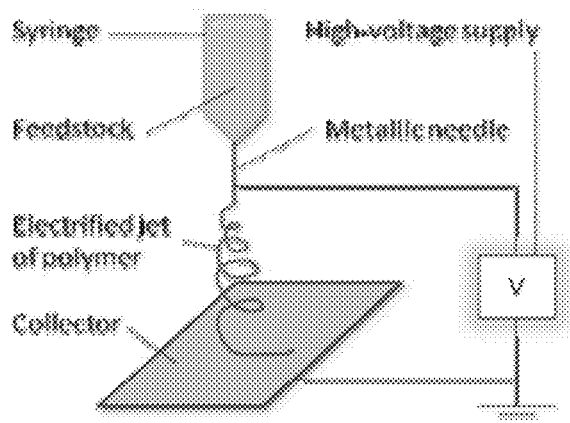
FIG. 1 shows a schematic of an electrospinning apparatus that can be used in a method of manufacturing an electrospun polypeptide nanofibril according to an embodiment of the present invention. A syringe pump is used for continuous feed of polymer solution over extended time periods. The collector is electrically conductive and can be an indium tin oxide-coated sheet of plastic. The voltage (V) can be on the order of 10 kV.

SEQ ID NO: 1 represents the amino acid sequence of $V^*$.
SEQ ID NO: 2 represents the amino acid sequence of $C^*$.
SEQ ID NO: 3 represents the partial amino acid sequence of chimeric protein Lα-$V^*_{40}C^*_2$.
SEQ ID NO: 4 represents the partial amino acid sequence of chimeric protein Lβ-$V^*_{40}C^*_2$.
SEQ ID NO: 5 represents the partial amino acid sequence of chimeric protein FN-$V^*_{40}C^*_2$.
SEQ ID NO: 6 represents the partial amino acid sequence of chimeric protein CI-2-$V^*_{40}C^*_2$.
SEQ ID NO: 7 represents the partial amino acid sequence of chimeric protein CIV-$V^*_{40}C^*_2$.
SEQ ID NO: 8 represents the partial amino acid sequence of chimeric protein MSH-$V^*_{40}C^*_2$.

DETAILED DISCLOSURE OF THE INVENTION

The subject invention is drawn to polypeptide electrospun nanofibrils and methods of manufacturing the same. As used herein, the abbreviations Lys, Tyr, Phe, Glu, Ala, kDa, and nm refer lysine, tyrosine, phenylalanine, glutamic acid (acidic form) or glutamate (basic form), alanine, kiloDalton, and nanometer, respectively.

In one embodiment, the subject invention can include an electrospun nanofibril comprising at least one polypeptide.

In another embodiment, the subject invention can include a method of preparing an electrospun nanofibril, comprising: dissolving a polypeptide in a solvent to form a solution; and electrospinning the solution to form the electrospun nanofibril.

In yet another embodiment, the subject invention can include a method of preparing an electrospun nanofibril, comprising: dissolving at least one polypeptide in a first solvent to form a first solution; dissolving at least one organic non-polypeptide polymer in a second solvent to form a second solution; combining the first solution and the second solution to form a solution blend; and electrospinning the solution blend to form the electrospun nanofibril.

Peptides account for about half of the dry mass of a living organism. Polypeptides are polymers of amino acids. Polypeptides constitute one of just four classes of natural biopolymers, the others being nucleic acids, polysaccharides, and phospholipids. All proteins are made of peptides (they have specific amino acid sequences and are "folded" polypeptides), and peptides are biodegradable and absorbable by the human body. Additionally, polypeptides are generally environmentally benign and they can have highly specific biofunctionality.

Modern methods of peptide preparation, such as solid-phase synthesis, solution-phase synthesis, and genetic engineering of microorganisms, have enabled mass production of a very large proportion of chemical structures in the space of all possible amino acid sequences, considering the "usual amino acids" alone (that is, the 20 most common amino acids found in genetic material), for which there are 20 different side chains. For a peptide of relatively modest degree of polymerization, for example, 32 residues, there are $20^{32}$ possible sequences or over $10^{40}$ different chemical structures. That is, a practically endless variety of peptide structures can be made from just the "usual" amino acids alone.

However, the related art includes very little guidance as to the conditions under which nanofibrils could be made from polypeptides of defined composition or of the properties of peptide-based nanofibrils. The related art includes no teaching of which, if any, polypeptide structures could be advantageous for electrospinning, nor is it obvious which conditions could be advantageous for a specific polypeptide structure that may be spinnable.

The subject invention includes methods for manufacturing electrospun nanofibrils made from polypeptides or polymer blends involving polypeptides. Electrospinning is a materials processing method that can be used to fabricate continuous, ultra-fine fibers of nanometer diameter from polymers in solution. Electrospun fibers can be produced from a solution containing polymers. Polymer solubility, electrostatic repulsion between polymer molecules, and solution conductivity may influence spinnability. A high voltage can be applied to a droplet of solution. As the droplet stretches, a critical point is reached, and a stream of liquid bursts forth from the surface, forming the Taylor Cone, an eponym of the Cambridge physicist Sir Geoffrey Ingram Taylor. Under favorable conditions, the stream of polymer solution will be continuous, and the solvent will evaporate. The polymer fiber becomes deposited on a collector (which may be electrically grounded) that is usually planar or cylindrical, but may have some other shape. The process can lead to the formation of uniform fibers of nanometer-scale diameter. The fibers are typically disorganized, as in a non-oven mat, but they can be oriented, depending on details of the spinning process. Nanofiber mats have an especially large surface area and a high porosity. Mat thickness can depend on spinning time. In general, synthetic polymers are simpler to process and yield a more controlled nanofibrous morphology than natural polymers.

Many of the advantageous properties of nanofibers according to embodiments of the subject invention, including surface area, porosity, and controllable thickness, resemble features of the extracellular matrix (ECM). This structure provides support and anchorage for cells, segregates tissues from one another, and can influence cell behavior in a variety of ways. Properties of the ECM may be especially relevant to the functional properties of a biomaterial. Nanofiber mats can therefore be useful for controlling cell migration, proliferation, and other aspects of cell or tissue behavior.

In an embodiment, electrospun nanofibrils are made from a solution of polypeptides of defined composition, alone or in combination with other kinds of (non-polypeptide) organic polymers of defined composition. The electrospun fibrils of the subject invention can be useful for many applications, such as product creation in the biosciences, bioengineering, and medicine.

Figure 11:
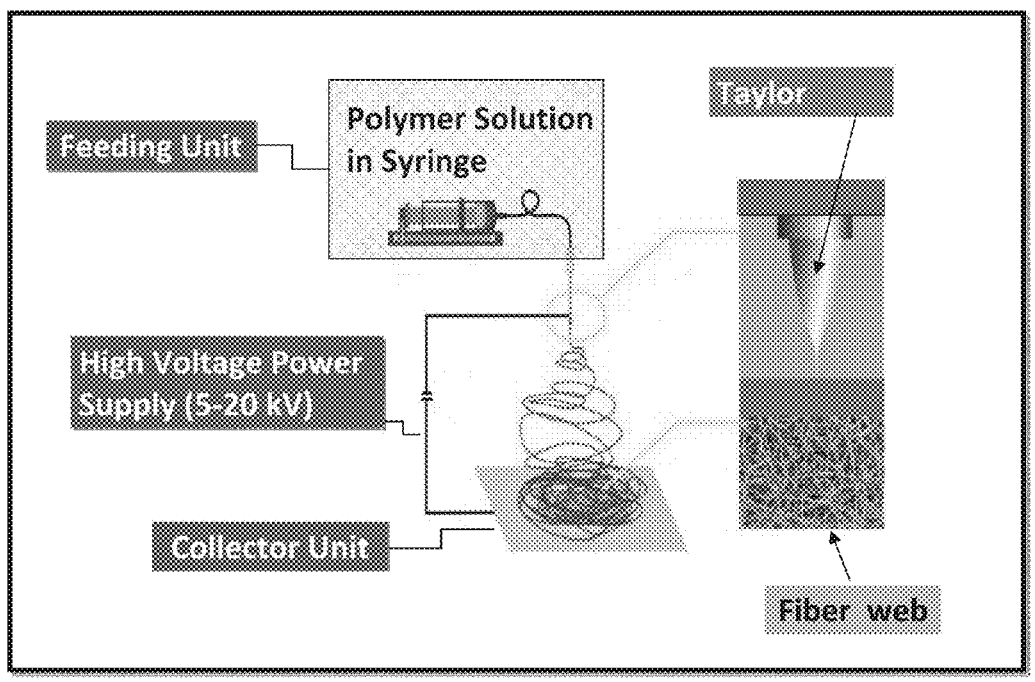
FIG. 11 shows an electrospinning apparatus that can be used in a method of manufacturing an electrospun polypeptide nanofibril according to an embodiment of the present invention. A syringe can be used to feed polymer solution and can lead to the formation of a Taylor Cone. The collector is electrically conductive. The voltage (V) can be, for example, 5-20 kV.

In an embodiment, referring to FIGS. 1 and 11, a syringe pump can be used to continuously feed a polymer solution (at a constant flow rate) over long time periods. The solution exiting the syringe or syringe pump can form a Taylor Cone, though embodiments are not limited thereto. The collector is a conductor, for example, an indium tin oxide-coated sheet of plastic. The collector can be grounded. The applied voltage can vary depending on the process conditions. For example, the voltage can be on the order of 10 kV. In one embodiment, the voltage can be in a range of from 5 kV to 30 kV. In another embodiment, the voltage can be 10 kV or about 10 kV. In a further embodiment, the voltage can be 12 kV or about 12 kV. The syringe needle inner diameter can be, for example, from 0.1 mm to 1.5 mm. The distance from the nozzle to the collector can be in a range of, for example, from 1 cm to 100 cm. In an embodiment, the nozzle-collector distance can be in a range of from 5 cm to 15 cm. In a further embodiment, the nozzle-collector distance can be 10 cm or about 10 cm.

Figure 2:
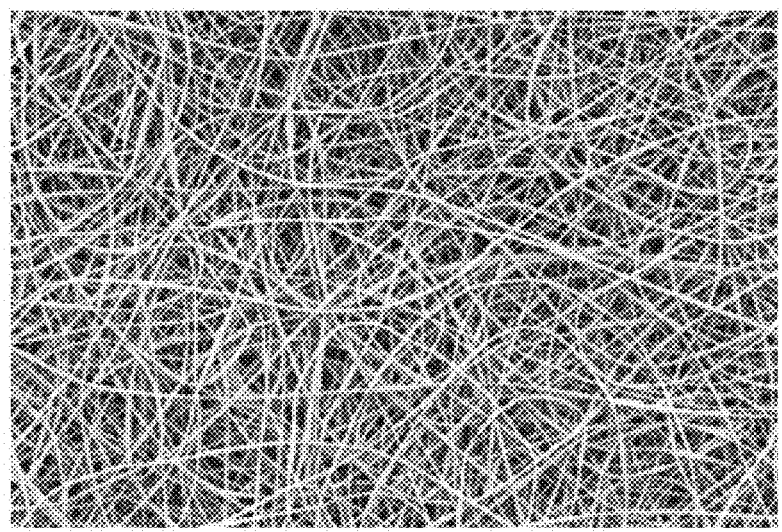
FIG. 2 shows a fibril mat.

FIG. 2 shows a scanning electron microscopy (SEM) image of accumulated nonwoven and non-oriented fibrils of poly(styrene-co-dimethylsiloxane). The image, from the Rutledge lab at the Massachusetts Institute of Technology, has been recolored.

In several embodiments, a solution of one or more polypeptides can be prepared and then used for electrospinning into a fibril. The solution can be prepared in any reasonable solvent known in the art, for example, water, ethanol, dimethylsulfoxide, glycerol, toluene, cyclohexane dimethylformamide, acetic acid, dichloromethane, ethylacetate, formic acid, hydrochloride acid, 1,1,1,3,3,3 Hexafluoro-2-propanol, hexafluoroisopropanol, methanol, trifluoroacetic acid, 2,2,2-trifluoroethanol, tetrahydrofuran, and mixtures thereof. The concentration of each polymer in solution can be from about 5 µg/mL to about 3.75 mg/mL. In certain embodiments, the concentration of each polymer in solution can be from about 10 µg/mL to about 750 µg/mL. The peptide solution can be a 13% (by weight) solution in water. In a further embodiment, the concentration of polymer(s) in solution can be from 1% (w/v) to 65% (w/v). In a further embodiment, the concentration of polymer(s) in solution can be from 10% (w/v) to 55% (w/v).

In a further embodiment, the concentration of polymer(s) in solution can be from 10% (w/v) to 50% (w/v). In a further embodiment, the concentration of polymer(s) in solution can be from 35% (w/v) to 50% (w/v). For example, an aqueous solution of 35% (w/v) of poly(L-ornithine) or an aqueous solution of 50% (w/v) poly(L-glutamate, tyrosine) can be used.

In an embodiment, a solution of one or more polypeptides and one or more non-polypeptide organic polymers can be prepared and then used for electrospinning into a fibril. The solution can be prepared in any reasonable solvent known in the art, for example, water. In an embodiment, the peptide solution can be a 13% (by weight) solution in water. In a further embodiment, the concentration of polymer(s) in solution can be from 1% (w/v) to 65% (w/v). In a further embodiment, the concentration of polymer(s) in solution can be from 10% (w/v) to 55% (w/v). In a further embodiment, the concentration of polymer(s) in solution can be from 10% (w/v) to 50% (w/v). In a further embodiment, the concentration of polymer(s) in solution can be from 35% (w/v) to 50% (w/v). For example, an aqueous solution of 35% (w/v) of poly(L-ornithine) or an aqueous solution of 50% (w/v) poly(L-glutamate, tyrosine) can be used.

Any peptide or polypeptide that can be dissolved to form a solution (in one or more solvents) can be used in embodiments of the subject invention. Such a peptide or polypeptide can used to form a solution which can be used for electrospinning to produce an electrospun nanofibril according to embodiments of the subject invention. Polypeptides that can be used according to embodiments of the subject invention include, but are not limited to, poly-L-arginine, poly-L-lysine, poly-L-aspartic acid, poly-L-glutamic acid, poly-L-glutamic acid, poly-L-proline, and poly-L-isoleucine, poly(lysine, phenylalanine), poly(L-ornithine), poly(L-glutamate, tyrosine), poly(Glu, Tyr, Lys), or any blend or combination thereof.

Polypeptides and combinations that can be used according to embodiments of the subject invention include, but are not limited to, poly-L-arginine poly-L-lysine, poly(Lys, Tyr), poly(Lys, Phe), poly-L-aspartic acid, poly-L-glutamic acid, poly(Glu, Tyr), poly (Glu, Ala), poly (Glu, Ala, Tyr), poly-L-proline, poly-L-isoleucine, poly(lysine, phenylalanine), poly(acrylic acid), poly(lysine, phenylalanine), poly(L-ornithine), or any combination or blend thereof (e.g., a blend of poly(acrylic acid) poly(lysine, phenylalanine), and poly(L-ornithine)).

In certain embodiments, the polypeptide(s) used according to embodiments of the subject invention can include any one or more of the following: poly-L-arginine hydrochloride (15 kDa-70 kDa), poly-L-lysine hydrobromide (15 kDa-30 kDa), poly-L-lysine hydrobromide (40 kDa-60 kDa), poly (Lys, Tyr) Lys:Tyr (4:1) hydrobromide (20 kDa-50 kDa), poly(Lys, Phe) Lys:Phe (1:1) hydrobromide (20 kDa-50 kDa), poly(Lys, Tyr) Lys:Tyr (1:1) hydrobromide (50 kDa-100 kDa), poly-L-aspartic acid sodium salt (15 kDa-50 kDa), poly-L-glutamic acid sodium salt (15 kDa-50 kDa), poly-L-glutamic acid sodium salt (50 kDa-100 kDa), poly (Glu, Tyr) Glu:Tyr (4:1) sodium salt (20 kDa-50 kDa), poly(Glu, Tyr) Glu:Tyr (1:1) sodium salt (20 kDa-50 kDa), poly (Glu, Ala) Glu:Ala (6:4) sodium salt (20 kDa-50 kDa), poly (Glu, Ala, Tyr) Glu:Ala:Tyr (6:3:1) sodium salt (20 kDa-50 kDa), poly-L-proline (≥30 kDa), poly-L-isoleucine (5 kDa-15 kDa), poly(lysine, phenylalanine), a blend of poly(acrylic acid) and poly(lysine, phenylalanine) in a ratio of 1:1 by volume, and a blend of poly(acrylic acid) and poly(lysine, phenylalanine) in a ratio of 3:1 by volume.

In preferred embodiments of the subject invention, peptides and polypeptides used for electrospinning are soluble in at least one solvent. That is, the peptide or polypeptide is capable of being solubilized in a solvent.

In an embodiment, peptides and polypeptides that can be used according to embodiments of the subject invention include those that are soluble in water at a temperature within a range of 20° C. to 30° C. In a further embodiment, peptides and polypeptides that can be used according to embodiments of the subject invention include those that are soluble in water at a concentration in a range of 1% (w/v) to 65% (w/v). In a further embodiment, peptides and polypeptides that can be used according to embodiments of the subject invention include those that are soluble in water at a temperature within a range of 20° C. to 30° C. at a concentration in a range of 1% (w/v) to 65% (w/v).

In an embodiment, peptides and polypeptides that can be used according to embodiments of the subject invention include those that satisfy the opposite charges criterion.

The opposite charges criterion is defined as follows: if both basic and acidic side chains are present in a polypeptide, and it is assumed that each basic side chain will have a charge of +1 and each acidic side chain a charge of −1, and if the cumulative number of such side chains represent more than 10% of the side chains of the entire polymer, then the absolute value of the balance of charge (minus charges−plus charges)/DP>0.3 (where DP=degree of polymerization=chain length). For example, the polymer poly(Glu, Lys, Tyr) 6:3:1 has 90% ionizable side chains and a balance of charge per residue of (6−3)/10=0.3. This polymer, then, is at the edge of the criterion. The polymer poly(Glu, Lys, Tyr) 7:2:2 has 82% ionizable side chains a balance of charge per residue of (7−2)/11=0.455, which meets the criterion. The polymer poly(Asp, Arg, Ala) 5:4:5 has 64% ionizable side chains and a balance of charge of (5−4)/14=0.07, which does not meet the criterion.

In an embodiment, peptides and polypeptides that can be used according to embodiments of the subject invention include those that are continuously spinnable at a flow rate in a range of from 1 μL/min to 100 μL/min. In a further embodiment, peptides and polypeptides that can be used according to embodiments of the subject invention include those that are soluble in water at a temperature within a range of 20° C. to 30° C. and are continuously spinnable at a flow rate in a range of from 1 μL/min to 100 μL/min. In a further embodiment, peptides and polypeptides that can be used according to embodiments of the subject invention include those that are soluble in water at a concentration in a range of 1% (w/v) to 65% (w/v) and are continuously spinnable at a flow rate in a range of from 1 μL/min to 100 μL/min. In a further embodiment, peptides and polypeptides that can be used according to embodiments of the subject invention include those that satisfy the opposite charges criterion and are continuously spinnable at a flow rate in a range of from 1 μL/min to 100 μL/min. In a further embodiment, peptides and polypeptides that can be used according to embodiments of the subject invention include those that are soluble in water at a temperature within a range of 20° C. to 30° C. at a concentration in a range of 1% (w/v) to 65% (w/v) and satisfy the opposite charges criterion. In a further embodiment, peptides and polypeptides that can be used according to embodiments of the subject invention include those that are soluble in water at a temperature within a range of 20° C. to 30° C. at a concentration in a range of 1% (w/v) to 65% (w/v) and are continuously spinnable at a flow rate in a range of from 1 μL/min to 100 μL/min. In yet a further embodiment, peptides and polypeptides that can be used according to embodiments of the subject invention include those that are soluble in water at a temperature within a range of 20° C. to 30° C. at a concentration in a range of 1% (w/v) to 65% (w/v) and satisfy the opposite charges criterion, and are continuously spinnable at a flow rate in a range of from 1 μL/min to 100 μL/min. In a further embodiment, polypeptides that can be used according to embodiments of the subject invention include those with a degree of polymerization (DP,=chain length) of at least 25, preferably 25-1500.

In an embodiment, peptides and polypeptides that can be used according to embodiments of the subject invention include those that satisfy the following: (non-polar surface area−polar surface area)/DP<100 square angstroms/residue, where 'non-polar surface' and 'polar surface' refer to side chains only and the terms are defined as in Wimley et al. (1996). The calculated value may be negative. For example, if the polymer poly(L-lysine) has an average DP of 1310, its polar surface area will be about $88.3 \times 10^3$ square angstroms, its non-polar surface about $129.2 \times 10^3$ square angstroms, and the net non-polar surface will be 31.2 square angstroms per residue. For poly(L-ornithine) with an average DP of 604, the polar surface of side chains is $40.7 \times 10^3$ square angstroms and the non-polar is $43.9 \times 10^3$ square angstroms, giving a net non-polar surface of 5.3 square angstroms per residue. For poly(Glu, Tyr) 4:1 with a DP of 186, the polar surface is $13.6 \times 10^3$ square angstroms and the non-polar surface is $12.6 \times 10^3$ square angstroms, giving a net non-polar surface of −5.28 square angstroms per residue.

In an embodiment, a blend of polymers can be electrospun into fibrils. The blend can comprise two polymers in a ratio by volume of, for example, 1:3 or 1:1. The blend can be formed by combining a solution of one polymer (for example, a 25% solution in water) with a solution of another polymer (for example, a 13% solution in water). In a further embodiment, the concentration of polymer(s) in each solution can be from 1% (w/v) to 65% (w/v). In a further embodiment, the concentration of polymer(s) in each solution can be from 10% (w/v) to 55% (w/v). In a further embodiment, the concentration of polymer(s) in each solution can be from 10% (w/v) to 50% (w/v). In a further embodiment, the concentration of polymer(s) in each solution can be from 35% (w/v) to 50% (w/v). For example, an aqueous solution of 35% (w/v) of poly(L-ornithine) and/or an aqueous solution of 50% (w/v) poly(L-glutamate, tyrosine) can be used.

In many embodiments, electrospun nanofibrils comprise at least one species of polypeptide. Each nanofibril can have a diameter of less than a micron. In alternative embodiments, the fibrils can have a width of more than a micron or about a micron. In an embodiment, the fibrils can have a width of about 2.5 microns. In certain embodiments, the fibrils can have a width of 750 nm, about 750 nm, 950.9 nm, or about 951 nm. The term "about," as used herein before a measured value, refers to within measurement error of the value following the term "about," typically +/−5% of the value (for example, "about 750 nm" refers to 712.5 nm to 787.5 nm). Preferably, the diameter of the fibrils ranges from about 10 nm up to about 10 μm. The methods of the subject invention can be used to electrospin any peptide, including, but not limited to, the 20 usual amino acids, other natural amino acids (aside from the 20 usual; for example, ornithine), synthetic or non-natural amino acids, and/or amino acid-like molecules that join to form peptide-like polymers (for example, peptoids). The methods of the subject invention can also be used to electrospin combinations of these peptides.

In certain embodiments, the polypeptides can be cross-linked, either before or after electrospinning. The polypeptides can be cross-linked using, for example, aldehydes, EDC, disulfide cross-linking, and/or oxidation. These examples should not be construed as limiting.

Aldehydes, for example, glutaraldehyde (GTA), are useful for cross-linking amines. EDC (1-ethyl-3-[3-dimethylaminopropyl] carbodiimide hydrochloride) is a zero-length cross-linking agent used to couple carboxyl groups to primary amines. If the peptides being electrospun contain cysteine, or they can be modified to contain free sulfhydryl groups, the polymers can be cross-linked by mere oxidation.

In a specific embodiment, GTA can be used to cross-link the amino acid ornithine. Ornithine has a free amino group in the side chain, and GTA is symmetrical, so it can react with one amino group in one chain and another one in another chain, linking the two together.

Figure 27:
FIG. 27 shows side chain structure of (A) ornithine and (B) lysine.

In an embodiment, poly (L-ornithine) was dissolved in water and continuously electrospun to produce electrospun naonfibrils. However, poly(L-lysine) is not continuously spinnable when dissolved in water. Poly(L-lysine) is highly soluble in water, but >300 kDa poly(lysine) was not spinnable from water, and 15-50 kDa poly(lysine) is spinnable at 40% though not continuously; at other concentrations the lower DP poly(lysine) was not spinnable at all (note that DP is degree of polymerization). This is surprising that an aqueous solution of poly(L-ornithine) can be continuously electrospun to produce electrospun nanofibrils, because poly (L-lysine) cannot be. FIG. 27 shows side chain structure of (A) ornithine and (B) lysine; the two side chains differ by a single methylene group. Ornithine has one fewer methylene group. The amino group is positively charged at neutral pH. The carbon atom on the opposite end of the side chain is the α-carbon in each case.

The fibrils of the subject invention may show good adhesion to human vascular endothelial cells (HUVECs), which are important in angiogenesis, vasculogenesis, wound healing, and cancer research. In an embodiment of the subject invention, a method can include characterizing properties of electrospun polypeptide fibers. For example, fiber mat solubility and/or biocompatibility can be characterized, in vivo and/or in vitro.

Elastin is a key structural component of the ECM in many tissues. Contributing to the elasticity and recoil of skin, elastin is also a constituent of the thin walls of arteries and veins, ligaments, lung parenchyma, and intestines. This chemically inert and highly insoluble material is composed of several covalently cross-linked molecules of its precursor, tropoelastin, a 67 kDa soluble, non-glycosylated, hydrophobic protein. Elastin also plays a role in storing mechanical energy in load-bearing tissues in animals. Elastin is a biological "elastomer", or viscoelastic polymer.

In an embodiment of the present invention, elastin-like peptides (ELPs) can be used to make fibers by electrospinning. ELPs can be useful as biomedical materials, alone or in combination with other chemical species. Chimeric peptides of ELP and fibroblast growth factor (FGF-ELPs), which can self-assemble into nanoparticles, have desirable properties for treating chronic wounds. ELP chimeras can also present advantages for the development of other kinds of biomaterials. Extracellular matrix (ECM) biochemical cue-ELP chimeras can be used to prepare electrospun nonwoven fiber mats for coatings for in vitro/ex vivo cell and tissue culture. That is, peptide chimeras can be electrospun using feedstock comprising ELPs and/or biochemical cues derived from ECM proteins. In an embodiment, the polymers used for electrospinning can have a molecular weight of less than 80 kDa. In an embodiment, the fiber diameter can be from 500-2000 nm.

Figure 20:
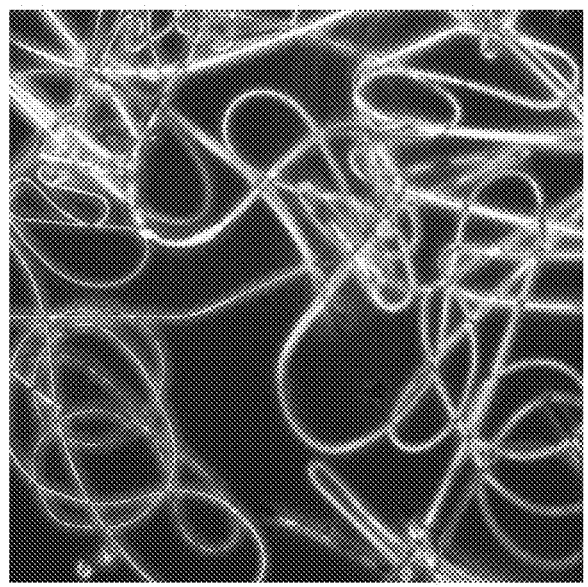
FIG. 20 shows a light microscopy image of nanofibers according to an embodiment of the present invention. The nanofibers are $V^*_{40}{}^*C_2$. $V^*$ is VPGVG (SEQ ID NO: 1), and $C^*$ is VPGVGVPGVGVPGCGVPGVGVPGVG (SEQ ID NO: 2), where V=valine, P=proline, G=glycine, and C=cysteine. A Zeiss Axiovert 200M microscope was used, equipped with a 40× objective.

Any ELP can be used for feedstock to produce an electrospun nanofibril. In an embodiment of the subject invention an ELP used for feedstock can include any one or more of the peptides shown in Table 2. Table 2 is for exemplary purposes only and should not be construed as limiting. Table 1 shows nomenclature for the V and C structural units listed in Table 2. The peptide $V^*_{40}C^*_2$, which has a calculated mass of 20.5 kDa, can be used. Referring to FIG. 20, the gene product is both readily purified and spinnable.

TABLE 1

ELP nomenclature

| Structural unit | Corresponding amino acid sequence* | Mass (Da) |
|---|---|---|
| V* | VPGVG (SEQ ID NO: 1) | 409 |
| C* | VPGVGVPGVGVPGCGVPGVGVPGVG (SEQ ID NO: 2) | 7050 |

V = valine, P = proline, G = glycine, C = cysteine

TABLE 2

ELP chimeras

| Peptide name | Mass (kDa) | Remarks |
|---|---|---|
| V*$_{40}$C*$_2$ | 20 | The base structure of the peptide chimeras |
| Lα-V*$_{40}$C*$_2$ | 21 | Laminin, α1 chain, IKVAV-GGGGGC-V*$_{40}$C*$_2$ (SEQ ID NO: 3) |
| Lβ-V*$_{40}$C*$_2$ | 21 | Laminin, β1 chain, YIGSR-GGGGGG-V*$_{40}$C*$_2$ (SEQ ID NO: 4) |
| FN-V*$_{40}$C*$_2$ | 21 | Fibronectin, RGD-GGGGGC-V*$_{40}$C*$_2$ (SEQ ID NO: 5) |
| CI-2-V*$_{40}$C*$_2$ | 22 | Collagen I, GTPGPQGIAGQRGVV-GGGGGC-V*$_{40}$C*$_2$ (SEQ ID NO: 6) |
| CIV-V*$_{40}$C*$_2$ | 22 | Collagen IV, GEFYFDLRLKGDKY-GGGGGC-V*$_{40}$C*$_2$ (SEQ ID NO: 7) |
| MSH-V*$_{40}$C*$_2$ | 22 | α-melanocortin stimulating hormone, SYSMEHFRWGKPV-GGGGGC-V*$_{40}$C*$_2$ (SEQ ID NO: 8) |

Figure 18:
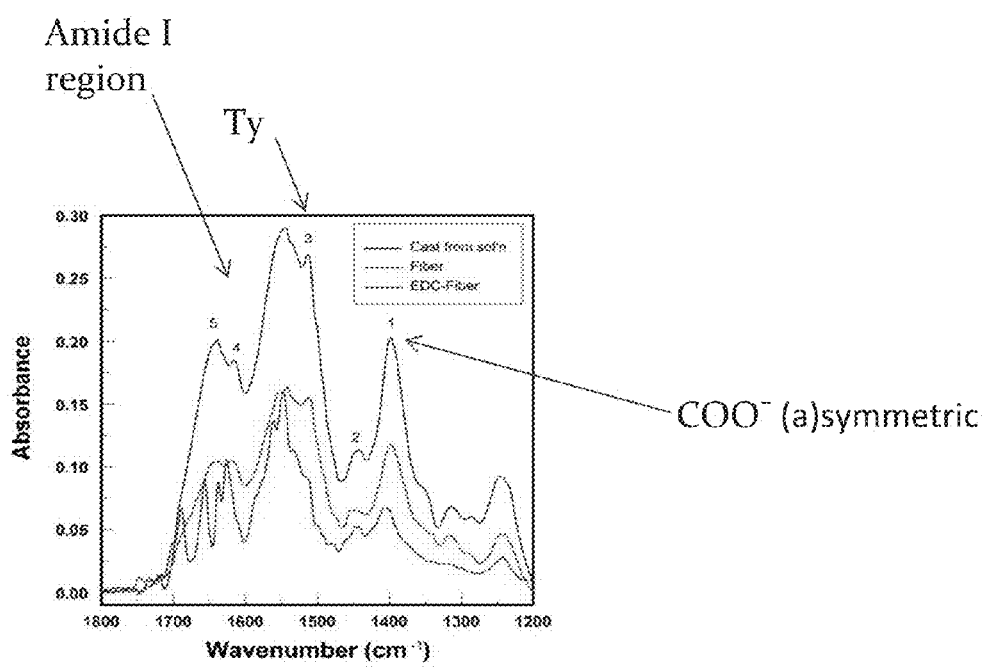
FIG. 18 shows absorbance vs. wavenumber (cm$^{-1}$) for a cast from solution, a fiber, and an EDC-fiber according to an embodiment of the present invention. The fiber is made from PLEY 4:1.

Electrospun elastomer matrices can be characterized both physico-chemically and biologically. Electron microscopy can be used to characterize fiber diameter and mat morphology. FTIR in attenuated total reflectance (ATR) mode can be used to compare peptide structure in solution and in fibers. FIG. 18 shows absorbance vs. wavenumber (cm$^{-1}$) for a cast from solution, a fiber, and an EDC-fiber according to an embodiment of the present invention. The fiber is made from PLEY 4:1.

Wide-angle X-ray scattering can be used to assess fiber crystallinity. A dynamic mechanical analyzer can be used to determine the stress-strain behavior of mats. Fiber strength can be, for example, a logarithmic function of molecular weight beyond a certain threshold value needed for spinnability. The same reasoning may apply to a non-woven fiber mat. Fiber solubility in water can be characterized, and the rate of dissolution in water at 25° C. can be determined by least-squares regression analysis.

Figure 21:
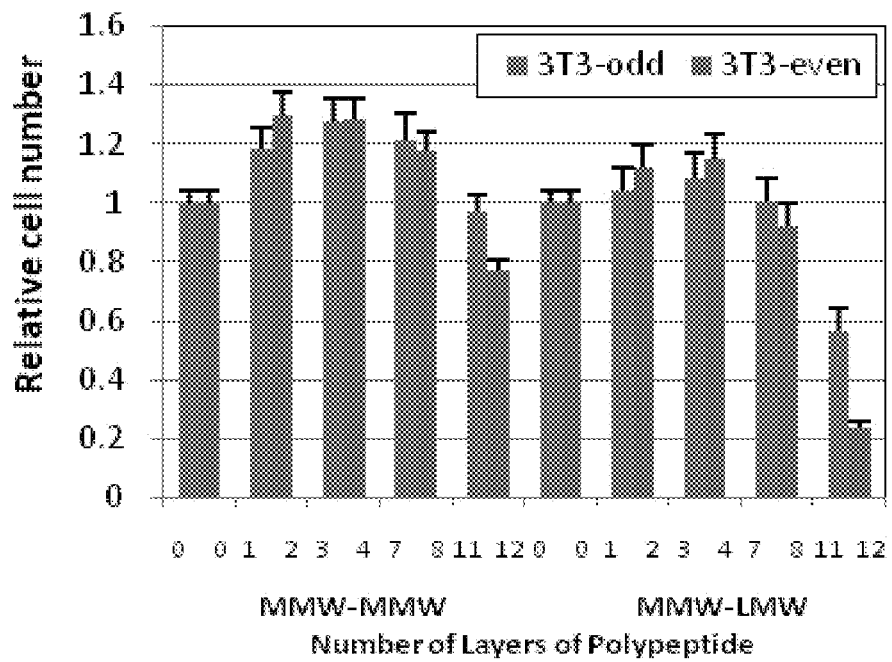
FIG. 21 shows reproducibility and layer dependence of NIH 3T3 cell proliferation on a non-functionalized synthetic biomatrix. The synthetic biomatrix was prepared from polypeptides by layer-by-layer assembly.

Cells obtained from a commercial source (e.g., Lonza, Walkersville) can be cultured at 37° C. in 5% CO$_2$ on fiber mats spun onto indium-tin-oxide-coated plastic or on a control surface. Control substrates for determining cell count on fibers made of biochemical cue-ELP chimeras can be fibers made of V*$_{40}$C*$_2$ alone, the substrate alone, and bare tissue culture plastic alone. Note that V* is VPGVG (SEQ ID NO: 1) and C* is VPGVGVPGVGVPGCGVPGVGVPGVG (SEQ ID NO: 2), where V=valine, P=proline, G=glycine, and C=cysteine. For proliferative cells (rMSCs and B16-F10s), the culture medium can be changed every about 48 hours until cells are confluent. Various cell types, e.g. 3T3 cells and normal human dermal fibroblasts, attach and proliferate normally on unmodified indium-tin-oxide-coated plastic. The number of adhered cells can be measured with, for example, a CyQuant® NF cell proliferation assay kit (Molecular Probes™; C35006) after 1, 3, and 7 days of culture, referring to FIG. 21. FIG. 21 does not show electrospun fibers. Fluorescence intensity can be measured at ambient temperature with, for example, a Wallac 1420 VICTOR2 fluorescence microplate reader (PerkinElmer Inc., USA) with excitation at 485 nm and emission detection at 530 nm. Each set of conditions can be analyzed in at least two independent experiments, seven replicates per experiment. Melanin production by B16-F10s can be assayed by in-situ measurement of relative absorbance at 450 nm. Absorbance per cell at this wavelength can also be compared between samples. rMSCs can be cultured in normal growth medium for about 24 hours and then in differentiation medium (Lonza), which can be changed every about 72 hours. Differentiation to osteoblasts can be quantified by a calcium deposition assay after 21-28 days, depending on cell apoptosis, which can be monitored daily by microscopy. Cell data sets can be compared by Student's t-test. p values <0.05 can be considered statistically significant.

In an embodiment, the solvent used with the feedstock can be water. The feedstock can also include any one or more of the ELPs of Table 2. The physicochemical properties of these peptides, and therefore of the fibers, can depend more on the ELP part of the chimera than the biochemical cue part. The biochemical properties of similar fibers can thus be quite different.

In an embodiment, additional cysteine residues can be added to the ELP by, e.g., modifying the corresponding gene near the 5'-end or the 3'-end.

In an embodiment a copolymer with ornithine can be used in solution (e.g., an aqueous solution) to produce electrospun nanofibrils. Monomers that can be used to make such a copolymer with ornithine include, but are not limited to, any of the monomers listed in Table 3. In various embodiments of the subject invention, a copolymer of ornithine and a monomer from Table 3 can be made according to the polymer compositions listed in Table 3.

TABLE 3

Ornithine copolymers

| Other monomer | Reason | Polymer composition |
|---|---|---|
| N/A | Test average molecular weight (degree of polymerization) | At least three values; e.g., 50 kDa; 25 kDa, 15 kDa |
| Lysine | Poly(lysine) is less spinnable than poly(ornithine), despite similarity (see FIG. 2) | At least three mole ratios, e.g., Orn:Lys::100:1, Orn:Lys::10:1, Orn:Lys::1:1 |

TABLE 3-continued

Ornithine copolymers

| Other monomer | Reason | Polymer composition |
|---|---|---|
| Alanine | Side chain consists of a methyl group, promotes α helix formation | At least three mole ratios, e.g., Orn:Ala::100:1, Orn:Ala::10:1, Orn:Ala::1:1 |
| Glycine | No side chain, destabilizes secondary structure | At least three mole ratios, e.g., Orn:Gly::100:1, Orn:Gly::10:1, Orn:Gly::1:1 |
| Proline | Side chain is bonded to the polymer backbone, can form an unusual type of helix [8] | At least three mole ratios, e.g., Orn:Pro::100:1 and Orn:Pro::10:1 |
| Valine | Hydrophobic, β-branched side chain | At least three mole ratios, e.g., Orn:Val::100:1, Orn:Val::10:1, Orn:Val::1:1 |
| Serine | Hydrogen bond donor in side chain | At least three mole ratios, e.g., Orn:Ser::100:1; Orn:Ser::10:1, Orn:Ser::1:1 |

In an embodiment, a polypeptide used to produce electrospun nanofibrils can be any of the compositions listed in Table 4 (synthetic version of the biomaterial source listed).

TABLE 4

Selected amino acid sequence motifs from proteins

| Biomaterial source | Structural feature | Composition or motif* |
|---|---|---|
| Spider silk | β sheets | 40% Ala |
| — | Amorphous domains | GGX, GA, GPGX |
| Silkwork silk | β sheets | GA, GAGS, GGA |
| Tropoelastin | — | GXOG |
| Eggshell | — | VPXYG |
| Elastin | — | VPGXG |
| Collagen | Triple helix | GPX, GXO |

*X and Y, any amino acid. O, hydroxyproline.

In an embodiment, oligopeptides synthesized by a solid-phase method can be combined with amino acid monomers in a solution-phase synthesis reaction, leading to advantageous tissue culture scaffolds.

In an embodiment, the polypeptide solution can include any one or more of the polypeptides listed in Table 5. The data in Table 5 were obtained by empirical study of the polypeptides.

In an embodiment, the polypeptide solution can include any one or more of the polypeptides listed in Table 6. A complex balance of charge and hydrophobic surface area per unit length, molecular weight, solvent polarity, counterion concentration, polymer concentration, and solution viscosity, among other properties, can make a polypeptide suitable for electrospinning.

TABLE 5

Summary of synthetic peptide electrospinning results

| Polymer | MW (kDa) | Behavior in aq. sol'n | Fiber, wt % | Approx. diameter (nm) | Continuous? | Fibers | Cross-linking |
|---|---|---|---|---|---|---|---|
| Poly(Glu) | 15-50 50-100 | Highly soluble | N | — | — | — | — |
| Poly(Glu, Lys) 4:1 | >150 | Gelates easily | Y, 1-5 | 100-200 | N | Soluble | — |
| Poly(Glu, Tyr) 4:1 | 20-50 | Soluble | Y, 20-35 | 250-2000 | Y, good app. | Insoluble at pH 2 | With diamine (or carbodiimide) |
| Poly(Glu, Lys, Tyr) 6:3:1 | 20-50 | Soluble | N | — | — | — | — |
| Poly(Lys) | >300 | Highly soluble | N | — | — | — | — |
| Poly(Lys) | 15-50 | Highly soluble | Y, 40 | N.D. | N | Soluble | — |
| Poly(ornithine) | >100 | Highly soluble | Y, 30 | 140-1500 | Y, OK app. | Insoluble at pH 12 | With glutaraldehyde |

The motifs in Table 4 are from structural proteins. The mole ratios of amino acids for polypeptide synthesis can be set in relation to motif sequence. For example, spider silk is 40% alanine. If 40% alanine and 60%/o ornithine is soluble, it may be useful for electrospinning. The synthesis product will be a random co-polymer. In the case that the peptide should prove spinnable, the resulting fibers can be characterized. For tropoelastin, glycine and hydroxyproline can be combined with ornithine to the extent that the synthesis product is spinnable. The amino acid sequence of the resulting polymer will be random. Nevertheless, some instances of GXOG can occur and influence polymer and fiber properties.

TABLE 6

Peptide structures

| Subproject | General polymer structure | Mole ratio | Target degree of polymerization | Rationale |
|---|---|---|---|---|
| A | Orn:VPGXG* | 10:01 | >50 kDa | Table 5, amino acid sequence of elastin, a structural protein |
| | Glu:GRGDG* | 10:01 | >50 kDa | Table 5, amino acid sequence of fibronectin |

TABLE 6-continued

Peptide structures

| Sub-project | General polymer structure | Mole ratio | Target degree of polymerization | Rationale |
|---|---|---|---|---|
| | Orn:Gly:Pro | 2:01:01 | >50 kDa | Table 5, amino acid sequence of collagen |
| | Glu:Gly:Pro | 2:01:01 | >50 kDa | Same as previous with anion substituted for cation |
| B | Cys:Orn | 1:25 | >50 kDa | Table 5, amino acid sequence of many secreted proteins |
| | Cys:Glu | 1:25 | >50 kDa | Same as previous with anion substitute for cation |
| C | Orn:Arg | 0.111111111 | >50 kDa | Based on data in Table 5 and recognition site of trypsin |
| | Orn:Lys | 0.111111111 | >50 kDa | Same as previous with lysine substituted for arginine |

*Orn = ornithine, a natural amino acid involved in the urea cycle and an intermediate on the synthetic pathway of arginine. It is selected here because it is known to work. See Khadka and Haynie (2010). VPGXG = Val-Pro-Gly-X-Gly. GRGDG = Gly-Arg-Gly-Asp-Gly.

In an embodiment, a polypeptide solution used for electrospinning can include at least one polypeptide and at least one non-polypeptide polymer.

The advantages of the use of synthetic peptides for electrospinning, according to embodiments of the subject invention (vis-à-vis proteins and non-biological polymers) include: control over water solubility and water spinnability; reduced need of organic solvents; avoidance of grafting steps for biofunctionalization (because functional motifs are directly incorporated in polymers); and avoidance of animal source material.

In an embodiment of the present invention, a polypeptide used for electrospinning can be cross-linked. For example, the polypeptide can be cross-linked using any of the cross-linkers listed in Table 7. In several embodiments, the cross-linking can be done after electrospinning

TABLE 7

Cross-linking methods

| Cross-linker | Positives | Negatives |
|---|---|---|
| Glutaraldehyde | Requires amino groups | Toxic |
| Carbodiimide | Requires carboxylate groups | Requires diamine for carboxylate in the absence of amino |
| Cysteine | Requires thiol groups | Requires control over reducing potential of solution |

In an embodiment, poly(L-glutamate, tyrosine) (PLEY) can be dissolved in a solvent and used to produce electrospun nanofibrils. The solvent can be, for example, water. In a further embodiment, homogenous nanofibers of pure synthetic polypeptide can be electrospun from an aqueous solution of PLEY in the absence of organic solvent and non-biological synthetic organic polymer. The PLEY concentration in solution can be in a range of, for example, 10% (w/v) to 55% (w/v). In an embodiment, the PLEY concentration in solution can be in a range of 20% (w/v) to 50% (w/v). In a specific embodiment, the PLEY concentration in solution can be 50% or about 50% (w/v).

Figure 28:
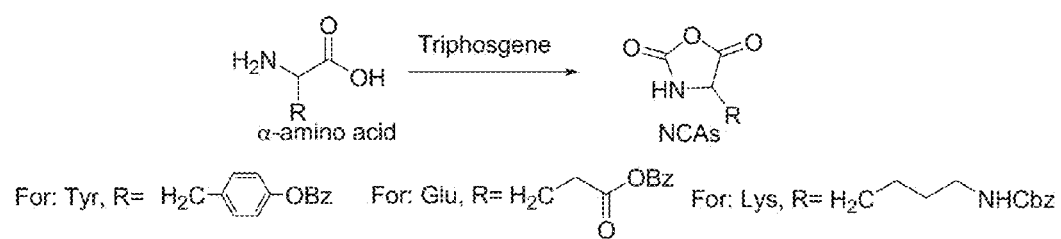
FIG. 28 shows a scheme of synthesis for α-amino acid N-carboxyanhydrides (NCAs). Tyrosine, glutamic acid and lysine are shown as examples.
Figure 29:
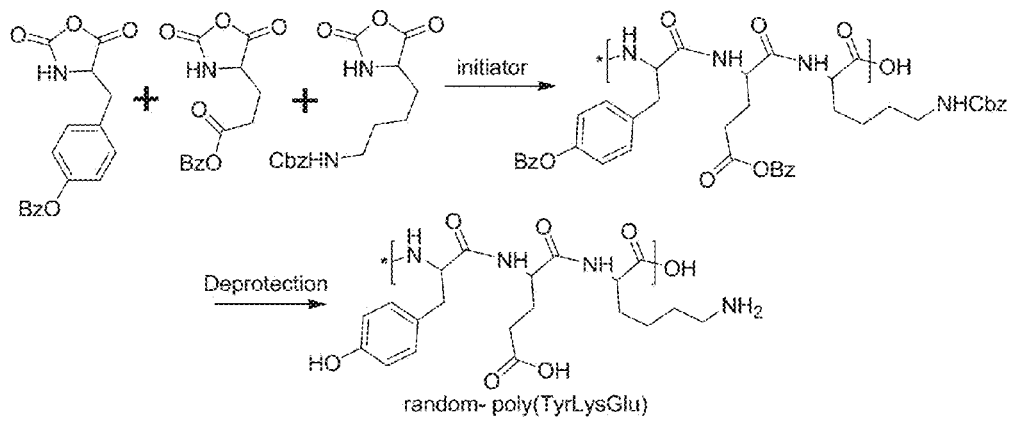
FIG. 29 shows a scheme of synthesis for random copolymerization of NCAs. A tyrosine-lysine-glutamic acid tripeptide is shown as an example.

In an embodiment, one or more random copolymers can be used in a solution to electrospin nanofibrils. Random copolymers can be synthesized by ring-opening polymerization of α-amino acid N-carboxyanhydrides (NCAs), as shown in FIGS. 28 and 29. The resulting polymers can be polydisperse and have no precise sequence, but they can have a definite amino acid composition. For example, the first two structures listed in Table 6 can have units of precise sequence as indicated, though these units can be included at random in the growing polypeptide. Polymer chain length and polydispersity can depend on, for example, synthesis conditions.

In certain embodiments, polypeptides used for electrospinning can have certain key characteristics. These can include water solubility before spinning, water insolubility after spinning and possible further processing, advantageous chemical functionality for various purposes, e.g. chemical cross-linking, controlled non-immuno-biochemical functionality, controlled longevity in a biochemical environment, and controlled immunogenicity for in-vivo applications. The physical, chemical, and biological properties of polypeptide nanofibers and nanofiber mats electrospun from aqueous solution can be controlled by controlling the amino acid composition and sequence of synthetic polypeptides. In many embodiments of the present invention, organic co-solvents and non-biological organic polymers can be excluded from the polymer feedstock.

Referring again to Table 5, the data suggest that the determinants of spinnability are non-obvious. For example, several highly-charged and highly-soluble peptides have proved surprisingly unsuitable for electrospinning. One such peptide is poly(L-glutamic acid), or poly(Glu). It is possible that these apparently non-spinnable peptides can be spinnable under other conditions, for instance, a change of degree of polymerization. Poly(L-lysine), or poly(Lys), gave very poor fibers at best, and only when the range of degree of polymerization corresponded to a molecular weight (MW) range of 15-50 kDa. It is surprising that poly(L-ornithine), which differs from poly(Lys) by a single methylene group in the side chain, was spinnable (see FIG. 27). The counterion was bromide for both basic side chains.

In embodiments of the present invention, the solution used for electrospinning nanofibers or nanofibrils can include random co-polymers, polymers "naturally" cross-linked (e.g., by disulfide bond formation), random incorporation of non-random, pre-made peptide-based motifs (e.g., RGD), or any combination thereof. Embodiments of the subject invention can also include biochemical or biological characterization of materials (e.g., non-woven materials). Control over peptide structure, as in embodiments of the subject invention, can enable crucial biomedical and bio-technological goals to be met, including avoidance of animal source material, "tunability" of physical, chemical, and biological properties of the fibers and fibrous materials, and the possibility of incorporating non-natural amino acids to achieve a specific technical purpose (e.g., rate of materials degradation). In an embodiment of the present invention, the structure of at least one polypeptide used for electrospinning can be "tuned" to ensure that it an advantageous structure.

Electrospun nanofibers and nanofibrils according to embodiments of the subject invention can advantageously allow control over solvent, amino acid composition or sequence, fiber properties, and properties of the resulting fiber mats. In addition, methods of the subject invention advantageously allow for advanced synthesis methods for polymer production, including chemical synthesis and/or microbial synthesis.

Electrospun nanofibers and nanofibrils according to embodiments of the subject invention can have advantageous applications in several areas. These include, but are not limited to, tissue engineering, wound healing, drug delivery, small-diameter vascular graft implants, surgical sutures, porous membranes for skin, liquid filtration, gas filtration, molecular filtration, electrostatic dissipation, electromagnetic interference shielding, photovoltaic devices (e.g., nano-solar cell), LCD devices, clothing with lowered air impedance, higher efficiency in trapping aerosol particles, anti-bio-chemical gases, skin cleansing, skin healing, skin therapy with or without medicine, thermal sensors, piezoelectric sensors, biochemical sensors, fluorescence optical sensors, and chemical sensors. Attractive features of electrospun nanofibers and mats according to embodiments of the subject invention can include a high surface-to-volume ratio, very high porosity, and tunable physico-mechanical properties. These properties of electrospun nanofibers and mats are unique; they are not characteristics of the corresponding bulk material. Fiber mat morphology, mechanical strength, pore size, shape, fiber distribution, and structure can be controlled. It is advantageous for materials development and production that manipulation of the polymer feed stock solution and process variables is relatively straightforward.

In several embodiments, nanofiber mats are intended for biomedical applications and are biocompatible and degradable; they have suitable mechanical properties under targeted conditions, and to the extent possible, they benefit from the ability to control material properties at the nanometer scale. An artificial matrix can influence cell growth, proliferation, differentiation, and other properties. Pore size, fiber size, tensile strength, Young's modulus, strain at break, and other physical properties of the mats can affect cell behavior. Physical properties of the mat can be controlled by controlling, e.g., the physical properties of the polymer(s) and/or conditions of the spinning process.

Electrospun scaffolds of electrospun nanofibers and nanofibrils according to embodiments of the subject invention are useful for different tissue engineering applications. There is flexibility in the selection of polymers, and the ability to control scaffold properties. Other relevant considerations in tissue engineering include fiber orientation, porosity and functionalization. Polymers may be natural or synthetic, biodegradable or non-degradable, pure or blended. One can optimize for mechanical and biomimetic properties.

Regarding drug delivery applications, the dissolution rate of a particulate drug will increase as the surface area of the carrier increases. Drug release at a defined rate over a definite period of time is possible. Drug loading is easily achieved during electrospinning according to embodiments of the subject invention, and the high applied voltage required for fiber production will generally have little influence on drug activity. The large surface area of fibers and therefore the short diffusion path length of small molecules will yield a higher overall release rate than for the corresponding bulk material. Other drug loading methods are possible, for instance, fiber mat coatings and encapsulation (coaxial and emulsion electrospinning). These techniques can be used to provide control over drug release kinetics. There is considerable flexibility in the type of drugs that can be incorporated: small molecules, peptides, proteins, nucleic acids, and others. The drug release profile can be further controlled by tuning polymer structure, nanofiber morphology and composition, and fiber mat porosity. Biodegradable and/or non-degradable materials can be used to control the character of drug release: diffusion alone or diffusion combined with scaffold degradation. The large surface area of a electrospun nanofibril fabric according to embodiments of the subject invention enables fast and efficient solvent evaporation.

Regarding wound healing applications, early-stage healing can be improved using an electrospun material over normal cotton gauze. Electrospun nanofiber mats can also be used as a scaffold to mimic native ECM in dermal wound healing.

Biosensors are analytical devices for detection of analytes. A device is typically composed of a sensitive biological element, a detector and a signal processor. The large surface area of an electrospun fiber mat according to embodiments of the subject invention can be useful for enabling sensitive detection of analytes, especially in conductometric sensors.

Materials and Methods

A solution of one or more polypeptides can be prepared and then used for electrospinning into one or more fibrils. The solution can be prepared in any reasonable solvent known in the art, for example, water or water in combination with a co-solvent, for example, ethanol. In an embodiment, a solution of one or more non-polypeptide organic polymers can be prepared, blended with the polypeptide solution, and then the blend can be used for electrospinning into one or more fibrils. In such a blend, the ratio of polypeptide to organic polymer can be, for example, one or less. In certain embodiments, the ratio of polypeptide to organic polymer can be greater than one.

The electrospun fibrils can be prepared using the apparatus shown in FIG. 1 or 11. The polymer or polymer solution can be provided in the syringe, and a voltage can be applied across the metallic needle and the collector, leading to an electrified jet of the polymer. The collector is a conductive material, for example, indium-tin-oxide-coated plastic, which is a conductive, transparent, mechanically flexible, and inexpensive material that is readily available. In an embodiment, during formation of the electrospun fibrils, the electric field strength can be varied by changing the voltage difference or distance between syringe and collector. For example, the electric field strength can be varied from about $10^2$ V/m to about $7 \times 10^5$ V/m. In an embodiment, the electric field strength can be about $10^5$ V/m.

Polypeptides that can be used according to embodiments of the subject invention include, but are not limited to, poly-L-arginine, poly-L-lysine, poly-L-aspartic acid, poly-L-glutamic acid, poly-L-glutamic acid, poly-L-proline, and poly-L-isoleucine, poly(lysine, phenylalanine), and poly(L-ornithine).

Polypeptides and combinations that can be used according to embodiments of the subject invention include, but are not limited to, poly-L-arginine poly-L-lysine, poly(Lys. Tyr), poly(Lys, Phe), poly-L-aspartic acid, poly-L-glutamic acid, poly(Glu, Tyr), poly (Glu, Ala), poly (Glu, Ala, Tyr), poly-L-proline, and poly-L-isoleucine, poly(lysine, phenylalanine), and a blend of poly(acrylic acid) poly(lysine, phenylalanine), and poly(L-ornithine).

In certain embodiments, the polypeptide(s) used according to embodiments of the subject invention can include any one or more of the following: poly-L-arginine hydrochloride (15 kDa-70 kDa), poly-L-lysine hydrobromide (15 kDa-30 kDa), poly-L-lysine hydrobromide (40 kDa-60 kDa), poly (Lys, Tyr) Lys:Tyr (4:1) hydrobromide (20 kDa-50 kDa), poly(Lys, Phe) Lys:Phe (1:1) hydrobromide (20 kDa-50 kDa), poly(Lys, Tyr) Lys:Tyr (1:1) hydrobromide (50 kDa-100 kDa), poly-L-aspartic acid sodium salt (15 kDa-50 kDa), poly-L-glutamic acid sodium salt (15 kDa-50 kDa), poly-L-glutamic acid sodium salt (50 kDa-100 kDa), poly (Glu, Tyr) Glu:Tyr (4:1) sodium salt (20 kDa-50 kDa), poly(Glu, Tyr) Glu:Tyr (1:1) sodium salt (20 kDa-50 kDa), poly (Glu, Ala) Glu:Ala (6:4) sodium salt (20 kDa-50 kDa), poly (Glu, Ala, Tyr) Glu:Ala:Tyr (6:3:1) sodium salt (20 kDa-50 kDa), poly-L-proline (?30 kDa), poly-L-isoleucine (5 kDa-15 kDa), poly(lysine, phenylalanine), a blend of poly(acrylic acid) and poly(lysine, phenylalanine) in a ratio of 1:1 by volume, and a blend of poly(acrylic acid) and poly(lysine, phenylalanine) in a ratio of 3:1 by volume.

EXEMPLIFIED EMBODIMENTS

The invention includes, but is not limited to, the following embodiments:

Embodiment 1

An electrospun nanofibril, comprising at least one polypeptide.

Embodiment 2

The electrospun nanofibril according to embodiment 1, wherein the at least one polypeptide comprises poly(L-glutamate, tyrosine) or poly(L-ornithine).

Embodiment 3

The electrospun nanofibril according to any of embodiments 1-2, further comprising at least one non-polypeptide organic polymer.

Embodiment 4

The electrospun nanofibril according to any of embodiments 1-3, wherein the at least one non-polypeptide organic polymer is poly(acrylic acid).

Embodiment 5

The electrospun nanofibril according to any of embodiments 1-4, wherein the at least one polypeptide is poly (lysine, phenylalanine).

Embodiment 6

The electrospun nanofibril according to any of embodiments 1-5, wherein a diameter of the nanofibril is less than a micron.

Embodiment 7

The electrospun nanofibril according to any of embodiments 1-6, wherein a diameter of the nanofibril is about 750 nm.

Embodiment 8

A method of preparing an electrospun nanofibril, comprising:
dissolving a polypeptide in a solvent to form a solution;
electrospinning the solution to form the electrospun nanofibril.

Embodiment 9

The method according to embodiment 8, wherein the polypeptide comprises poly(Glu, Tyr) or poly(L-ornithine).

Embodiment 10

The method according to any of embodiments 8-9, wherein a diameter of the nanofibril is less than a micron.

Embodiment 11

The method according to any of embodiments 8-10, wherein electrospinning the solution comprises electrospinning the solution in an electric field of from about $10^2$ V/m to about $7 \times 10^5$ V/m.

Embodiment 12

The method according to any of embodiments 8-11, wherein the solvent is water.

Embodiment 13

A method of preparing an electrospun nanofibril, comprising:
dissolving at least one polypeptide in a first solvent to form a first solution;
dissolving at least one organic non-polypeptide polymer in a second solvent to form a second solution;
mixing the first solution and the second solution to form a solution blend; and
electrospinning the solution blend to form the electrospun nanofibril.

Embodiment 14

The method according to embodiment 13, wherein the at least one polypeptide comprises poly(Glu, Tyr) or poly(L-ornithine).

Embodiment 15

The method according to any of embodiments 13-14, wherein a diameter of the nanofibril is less than a micron.

Embodiment 16

The method according to any of embodiments 13-15, wherein electrospinning the solution blend comprises electrospinning the solution blend in an electric field of from about $10^2$ V/m to about $7 \times 10^5$ V/m.

Embodiment 17

The method according to any of embodiments 13-16, wherein the at least one organic non-polypeptide polymer is poly(acrylic acid).

Embodiment 18

The method according to any of embodiments 13-17, wherein the at least one polypeptide is poly(lysine, phenylalanine); wherein the first solvent is water; and wherein the second solvent is also water.

Embodiment 19

The method according to any of embodiments 13-18, wherein the first solution is a 13% solution of poly(lysine, phenylalanine); wherein the second solution is a 25% solution of poly(acrylic acid); and wherein the solution blend comprises a volume ratio of the first solution to the second solution of 1:1 or 1:3.

Embodiment 20

The method according to any of embodiments 13-19, wherein the first solvent is water.

Embodiment 21

The method according to any of embodiments 13-20, wherein the second solvent is water.

Embodiment 22

The method according to any of embodiments 13-17 and 19-20, wherein the second solvent is not water.

Embodiment 23

The method according to any of embodiments 1-5, 8-9, 11-14, and 16-22, wherein a diameter of the nanofibril is more than a micron.

Embodiment 24

The electrospun nanofibril or method according to any of embodiments 1-5, 8-9, 11-14, and 16-22, wherein a diameter of the nanofibril is about a micron.

Embodiment 25

The electrospun nanofibril or method according to any of embodiments 1-24, wherein a diameter of the nanofibril is from about 10 nm to about 10 μm.

Embodiment 26

The electrospun nanofibril or method according to any of embodiments 1-4, 6-17, and 20-25, wherein the at least one polypeptide is poly(L-ornithine).

Embodiment 27

The electrospun nanofibril or method according to any according to any of embodiments 1-4, 6-17, and 20-25, wherein the at least one polypeptide is poly(L-glutamate, tyrosine).

Embodiment 28

The electrospun nanofibril or method according to any according to any of embodiments 1-27, wherein the at least one polypeptide is a synthetic polypeptide.

Embodiment 29

The electrospun nanofibril or method according to any according to any of embodiments 1-28, wherein the at least one polypeptide satisfies the opposite charges criterion.

Embodiment 30

The electrospun nanofibril or method according to any according to any of embodiments 1-29, wherein the at least one polypeptide satisfies the following equation: (non-polar surface area−Polar surface area)/DP<100 square angstroms/residue, wherein DP is the degree of polymerization of the at least one polypeptide.

Embodiment 31

The electrospun nanofibril or method according to any according to any of embodiments 1-30, wherein the degree of polymerization of the at least one polypeptide is at least 25.

Embodiment 32

The method according to any according to any of embodiments 8-31, wherein the at least one polypeptide is present in the solution at a concentration in a range of from 1% to 65% (w/v).

Embodiment 33

The electrospun nanofibril or method according to any according to any of embodiments 8-32, wherein the at least one polypeptide is dissolved in the solvent at a temperature in a range of from 20° C. to 30° C.

Embodiment 34

The electrospun nanofibril or method according to any according to any of embodiments 8-33, wherein electrospinning the solution comprises continuously electrospinning the solution at a flow rate in a range of from 1 μL/min to 100 μL/min.

Following are examples that illustrate procedures for practicing the invention. These examples should not be construed as limiting. All percentages are by weight and all solvent mixture proportions are by volume unless otherwise noted.

Example 1—Electrospun PAA Fibril

Figure 3:
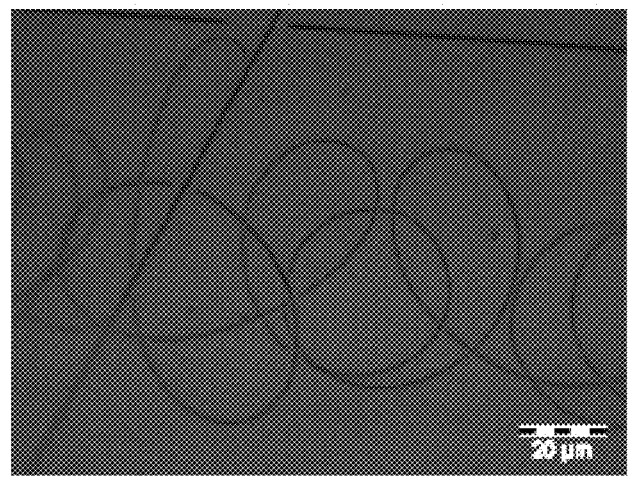
FIG. 3 shows electrospun fibrils according to an embodiment of the present invention.

Poly(acrylic acid) (PAA) was electrospun into a fibril. The fibrils were prepared from a 25% solution in water (Polysciences, Inc., USA, catalog #03326, molecular weight over 200 kDa). Fibril diameter was about 750 nm. The resulting fibrils are shown in FIG. 3, the scale bar of which is 20 μm.

Example 2—Electrospun PAA/PLF Fibril

Figure 4:
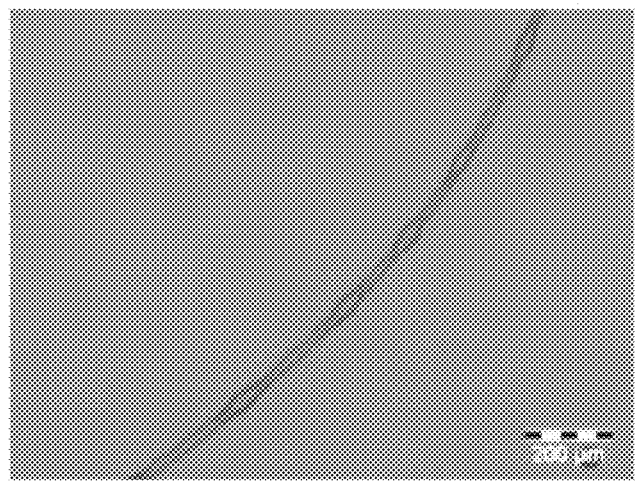
FIG. 4 shows an electrospun fibril according to an embodiment of the present invention.

A blend of PAA and poly(lysine, phenylalanine) (PLF) was electrospun into a fibril. The blend of PAA solution and PLF solution was in a ratio of 1:1 by volume. The average molecular weight of the PLF was about 48 kDa (Sigma, USA). PLF was prepared as a 13% solution in water and mixed with 25% PAA in a 1:1 v/v ratio. The mixture was diluted to 4:5 with HCl, pH 1.8 for electrospinning. The resulting fibrils are shown in FIG. 4, the scale bar of which is 200 μm.

Example 3—Electrospun PAA/PLF Fibril

Figure 5:
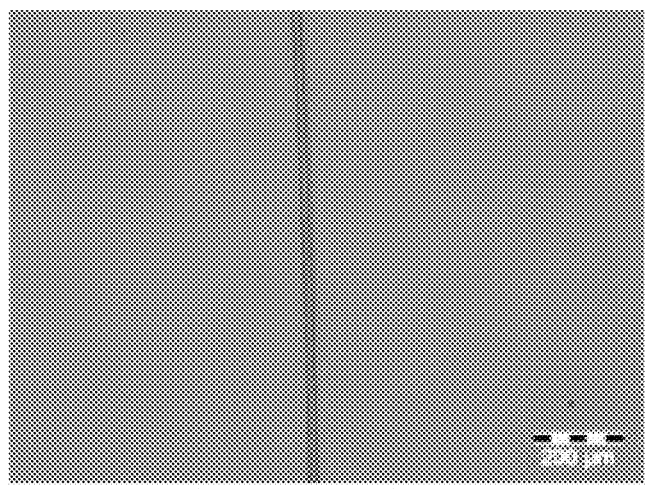
FIG. 5 shows an electrospun fibril according to an embodiment of the present invention.

Forming another set of fibrils from the same blend of PAA and PLF used in Example 2 resulted in the fibril shown in FIG. 5. The fibril is hundreds of microns long, and no beadlike structures can be seen. The electric field strength can be changed during fibril spinning. This fibril is much thicker than the one of Example 2. The scale bar of FIG. 5 is 200 μm.

Example 4—Electrospun PAA/PLF Fibril

Figure 6:
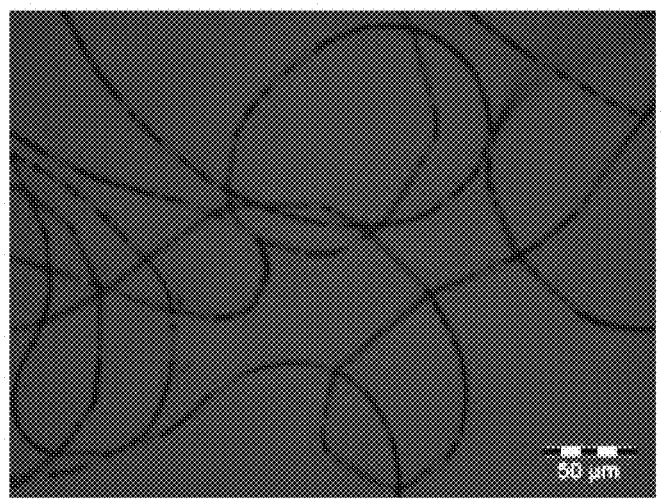
FIG. 6 shows electrospun fibrils according to an embodiment of the present invention.

Fibrils of a blend of PAA and PLF were electrospun. PLF (13.3%) was mixed with 25% PAA in a 1:3 v/v ratio. The sample was not diluted further. No beadlike structures were detected. The fibrils are about 2.5 microns thick. The resulting fibrils are shown in FIG. 6, the scale bar of which is 50 μm.

Example 5—Electrospun PAA/PLF Fibril

Figure 7:
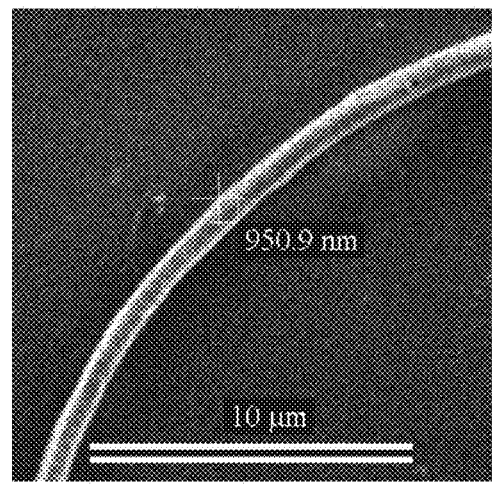
FIG. 7 shows an electrospun fibril according to an embodiment of the present invention.

Fibrils of a blend of PAA and PLF were electrospun. The sample was sputter-coated with gold for visualization by scanning electron microscopy. Electrospinning was done in the Nanoscience Technology Center at the University of Central Florida and the sample was analyzed in the Nanomaterials and Nanomanufacturing Research Center at the University of South Florida. The diameter is 950.9 nm. The resulting fibrils are shown in FIG. 7, the scale bar of which is 10 μm.

Example 6—Electrospun Poly(L-Ornithine) Fibril

All of this work was done in the Department of Physics, University of South Florida.

Lyophilized poly(L-ornithine) hydrobromide (152 kDa by viscosity), GTA (25% w/v in water), and indium tin oxide (ITO)-coated poly (ethyleneterephthalate) (60 Ω/in$^2$) were obtained from Sigma-Aldrich (USA) and used as received. Syringe needles for electrospinning were from Jensen Global (USA). A Glassman (USA) PS/FX20P15.0-11 20 kV power supply was used to generate electrical potential.

Poly(L-ornithine) (PLO) was dissolved in deionized (DI) water in the range 10-40%° w/v and introduced into a 1 mL syringe fitted with a blunt-tip metal needle capillary of inner diameter 0.6 mm. A copper wire connected the needle tip to the positive pole of the power supply; the ITO-coated collector was grounded. All samples were tested or modified at ambient temperature, pressure and humidity. Preliminary visualization of the nanofibers was done with a Zeiss Axiovert 200 inverted microscope (Germany) equipped with a Roper Scientific MicroMAX System CCD camera (USA). Detailed images of nanofibers were obtained with a JEOL JSM-6390LV scanning electron microscope (Japan).

Figure 8:
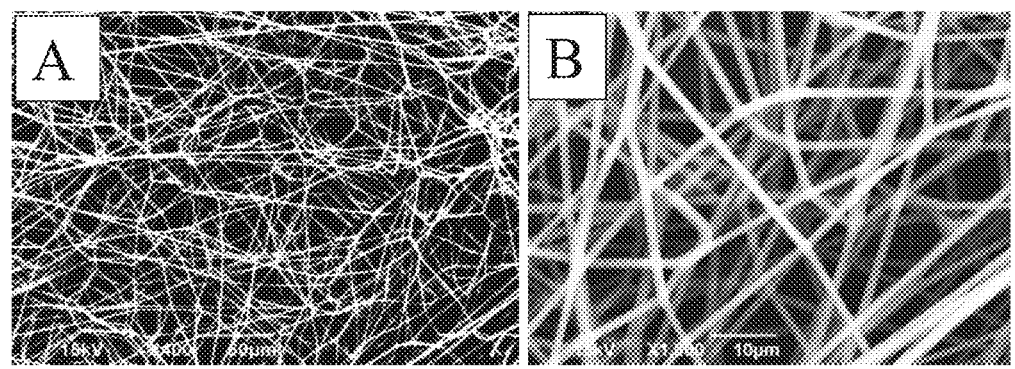
FIG. 8 shows SEM images of electrospun mats of fibrous polypeptides according to an embodiment of the present invention. (A) 400× magnification; scale bar is 50 µm. (B) 1800×; scale bar is 10 µm. The feedstock was 40% w/v poly(L-ornithine) (PLO) in water.

PLO nanofibers were spun from an aqueous solution if the polymer concentration was at least 20% w/v. Fibers produced at 20%, 25% and 30% PLO contained beads, perhaps due to limited polymer entanglement. At 35% and 40%, the fibers were long, continuous, essentially bead-free, and suitable for mat production (see FIG. 8; feedstock was 40% w/v PLO in water). Less promising fibers were obtained at 45%, and none at 50%. PLO concentration and other electrospinning parameters influenced fiber production. The applied voltage was 5-20 kV, the nozzle-to-electrically grounded collector distance was 5-15 cm. The optimal values for fiber production suggested by the present work were 9 kV and 10 cm. The electric field was $-10^3$ V/m.

Figure 9:
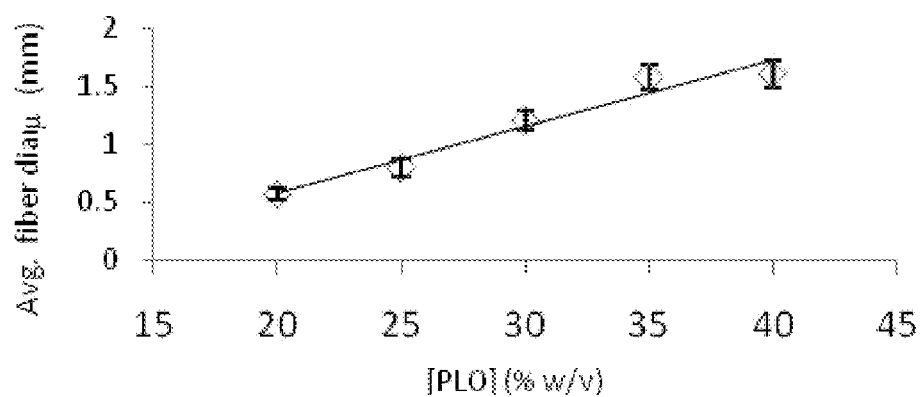
FIG. 9 shows a graph of polypeptide fiber diameter (in µm) vs. PLO concentration.

Referring to FIG. 9, the fiber diameter varied approximately linearly with concentration when the needle gauge and applied voltage were held constant. The ability to control fiber diameter can allow for flexibility in the design and fabrication of nanofibers for different applications.

The solubility of PLO fibers was tested. Fibers dissolved readily in aqueous solution at any pH and were sensitive to high humidity. The PLO fibers were cross-linked from the vapor of GTA solution. A GTA molecule cross-links peptides by reacting with two free amino groups on separate side chains.

PLO nanofibers on an ITO substrate were cross-linked in situ. Samples were inverted and affixed to the top of a 25% GTA vapor-filled chamber consisting of 3 mL of GTA in a 40 mm-diameter uncapped Petri dish in an 80 mm-diameter Petri dish. The larger dish was covered, sealed with parafilm, and maintained for a defined time interval.

Figure 10:
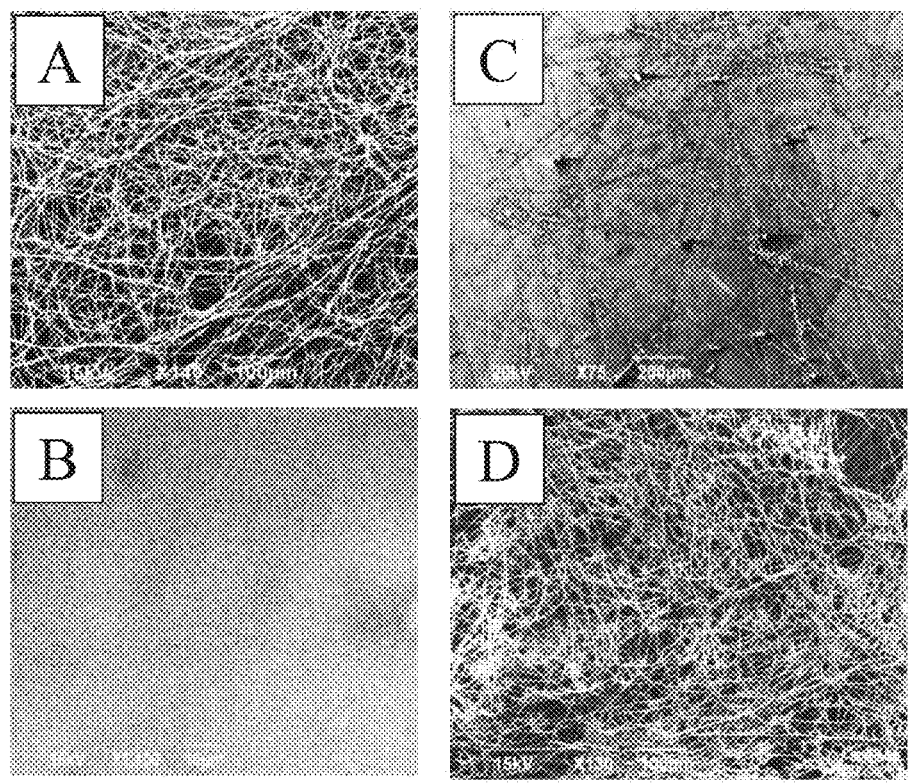
FIG. 10 shows fibrous polypeptide mats according to an embodiment of the present invention. The scale bars are: (A) 100 µm, (B) 10 µm, (C) 200 µm, and (D) 100 µm. The feedstock was 40% w/v PTO in water.

The cross-linking procedure resulted in slight shrinkage and discoloration of the fiber membrane. The extent of cross-linking was assayed qualitatively by immersion of a fibrous mat in aqueous solution at different pH values for different time periods (FIG. 10). FIG. 10A shows an unmodified control with feedstock of 40% w/v PLO in water. Figure B shows no cross-linking after one minute of immersion in DI water and one hour of drying. FIG. 10C is after 15 minutes of GTA vapor crosslinking, one hour of immersion in DI water, and one hour of drying. FIG. 10D is after six hours of GTA vapor cross-linking, 48 hours of immersion in DI water, and one hour of drying. A cross-linking time of about six hours or more gave mats that were essentially insoluble; about one hour of cross-linking gave limited solubility.

Example 7—Poly(L-Lysine)

Poly(L-lysine) was tested and found to not be continuously spinnable when dissolved in water. Poly(L-lysine) is highly soluble in water, but >300 kDa poly(lysine) was not spinnable from water, and 15-50 kDa poly(lysine) is spinnable at 40% though not continuously; at other concentrations the lower DP poly(lysine) was not spinnable at all (DP is degree of polymerization). This supports the conclusion that it is surprising that an aqueous solution of poly(L-ornithine) can be continuously electrospun to produce electrospun nanofibrils. Referring again to FIG. 27, the two side chains differ by a single methylene group.

Example 8—Poly(Glu)

Poly(Glu) 15-50 kDa and poly(Glu) 50-100 kDa were found to soluble in water but not spinnable at any concentration.

Example 9—Poly(Glu, Lys)

Poly(Glu, Lys), 4:1, MW>150 kDa was tested and found to be soluble but poorly spinnable at 1-5% and not spinnable at higher concentrations.

Example 10—Poly (Glu, Tyr)

Poly(Glu, Tyr), 4:1, 20-50 kDa was tested and found to be soluble and spinnable at 20-50%.

Example 11—Poly(Glu, Lys, Tyr)

Poly(Glu, Lys, Tyr), 6:3:1, 20-50 kDa was tested and found to be soluble but not spinnable at any concentration. It was hypothesized that a smaller proportion of Lys could make the poly(Glu, Lys, Tyr)spinnable, because the new composition would be more similar to poly(Glu, Tyr) 4:1. Poly(Glu, Tyr, Lys) 4:1:1 was tested, and it was found that certain molecular weight species were indeed spinnable, though fibers formed clumps. The following molecular weight species were tested: 9,450 kDa, 13,650 kDa, 86,700 kDa, and 176,850 kDa, all average mass values determined by light scattering. The only one that was spinnable was 176,850 kDa. Note that the poly(Glu, Lys, Tyr) 4:1:1 has 83% ionizable side chains and a balance of charge per residue of (4-1)/6=0.5. Poly(Glu, Tyr, Lys) 5:1:1 is likely to be more spinnable than poly(Glu, Tyr, Lys) 4:1:1.

Example 12—$V^*_{40}C^*_2$ $V^*_{40}C^*_2$ was tested and found to be continuously spinnable. $V^*$ is VPGVG (SEQ ID NO: 1), and $C^*$ is VPGVGVPGVGVPGCGVPGVGVPGVG (SEQ ID NO: 2), where V=valine, P=proline, G=glycine, and C=cysteine. This was surprising because this 20 kDa peptide has a charge per unit length is 0. Thus, it would not normally be expected to be soluble or continuously spinnable.

E. coli cells transformed with a plasmid vector containing a gene encoding $V^*_{40}C^*_2$ were cultured under conditions favoring cell proliferation and gene expression. Recombinant peptide was purified by a three-step process. In the first two, phosphate-buffered saline (PBS) containing 10 mM dithiothreitol (DTT), a reducing agent, was used to dissolve the concentrated $V^*_{40}C^*_2$-containing pellet obtained by centrifugation. Concentrated $V^*_{40}C^*_2$ gels at 37° C. but is soluble at 4° C.; ELPs undergo entropically-driven contraction and aggregation above a transition temperature that depends on the amino acid sequence. In the third step the peptide was resuspended in deionized water (DI) and dialyzed overnight against DI to remove residual NaCl, PBS, and DTT. $V^*_{40}C^*_2$ mass was verified by SDS-PAGE, which showed a single band between 20 and 25 kDa (data not displayed); the recombinant peptide was apparently monodisperse. The mass discrepancy was likely due to the high percentage of proline in $V^*_{40}C^*_2$, which can decrease the flexibility of the polymer backbone and the electrophoretic mobility in a dense gel matrix. Purified peptide was lyophilized for long-term storage. FIG. 20 demonstrates the spinnability of lyophilized $V^*_{40}C^*_2$ following reconstitution in water.

FIG. 20 shows a light microscopy image of $V^*_{40}C^*_2$ nanofibers. A Zeiss Axiovert 200M microscope was used, equipped with a 40× objective. Lyophilized peptide was reconstituted in distilled and deionized water immediately prior to electrospinning. The final concentration was 50% (w/v). Trace amounts only of buffer ions and counterions will have been present in the peptide feedstock; there are only two ionizable amino acid residues per molecule. Some molecules may have become cross-linked by disulfide bond formation prior to spinning. The potential was 9.5 kV. The spinneret-collector distance was 10 cm. Fibers were collected on 60 Ω/in² indium-tin oxide-coated plastic (Sigma). The average diameter of the fibers was less than 1 µm. Some fibers appeared brighter than others; some were more in the focal plane of the objective lens than others.

Example 13—Poly(L-Glutamate, Tyrosine)

Poly(L-glutamate, tyrosine) (PLEY) was dissolved in water at various concentrations and electrospun. The apparatus shown in FIG. 11 was used. Homogenous nanofibers of pure synthetic polypeptide were electrospun from the aqueous solution in the absence of organic solvent and non-biological synthetic organic polymer. The PLEY concentration in solution was varied from 10% (w/v) to 55% (w/v). Table 8 shows the results of electrospinning using varied compositions of PLEY. The nozzle-collector distance was varied from 5 cm to 15 cm, and the applied voltage was varied from 5 kV to 30 kV. The results indicated that apparent optimal values are 50% (w/v) PLEY concentration, 10 cm nozzle collector distance, and 12 kV applied voltage.

TABLE 8

Composition of PLEY nanofibers

| % PLEY (W/V) | Result |
|---|---|
| 10 | No fibers |
| 15 | No fibers |
| 20 | Few beaded fibers |
| 25 | Beaded fibers |
| 30 | Fiber |
| 35 | Fiber |
| 40 | Fiber mate |
| 45 | Fiber mate |
| 50 | Fiber mate |
| 55 | Discontinuous fibers |

Figure 12:
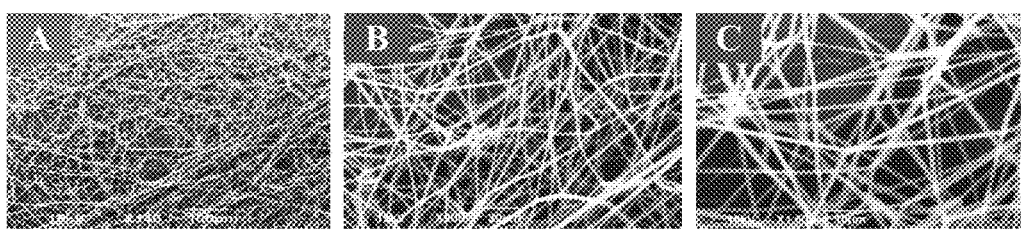
FIG. 12 shows SEM images of electrospun mats of fibrous polypeptides according to an embodiment of the present invention. (A) 140× magnification; the scale bar is 100 µm. (B) 900× magnification; the scale bar is 20 µm. (C) 1600× magnification; the scale bar is 10 µm. The feedstock was 50% w/v poly(L-glutamate, tyrosine) (PLEY) 4:1 in water.

FIG. 12 shows SEM images of electrospun mats of fibrous polypeptides made from 50%. w/v PLEY in water. (A) 140× magnification; the scale bar is 100 µm; the voltage applied was 19 kV. (B) 900× magnification; the scale bar is 20 µm; the voltage applied was 15 kV. (C) 1600× magnification; the scale bar is 10 µm; the voltage applied was 19 kV.

Figure 13:
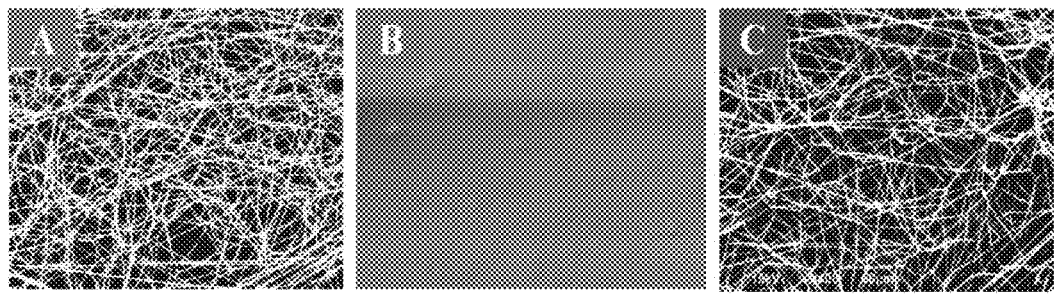
FIG. 13 shows images of electrospun mats of fibrous polypeptides, according to an embodiment of the present invention, (A) with no further treatment, (B) following addition of a few drops of deionized water (DI) for about one minute and drying for about one hour (the fiber web has dissolved), and (C) following cross-linking in EDC-ethanol solution for about four hours, immersion in DI for about two days, and drying for about three hours (note that EDC is 1-ethyl-3-[3-dimethylaminopropyl]carbodiimide hydrochloride).

FIG. 13 shows images of electrospun mats of fibrous polypeptides made from a PLEY aqueous solution (A) with no further treatment, (B) following addition of a few drops of deionized water (DI) for about one minute and drying for about one hour (the fiber web has dissolved), and (C) following cross-linking in EDC-ethanol solution for about four hours, immersion in DI for about two days, and drying for about three hours.

Figure 24:
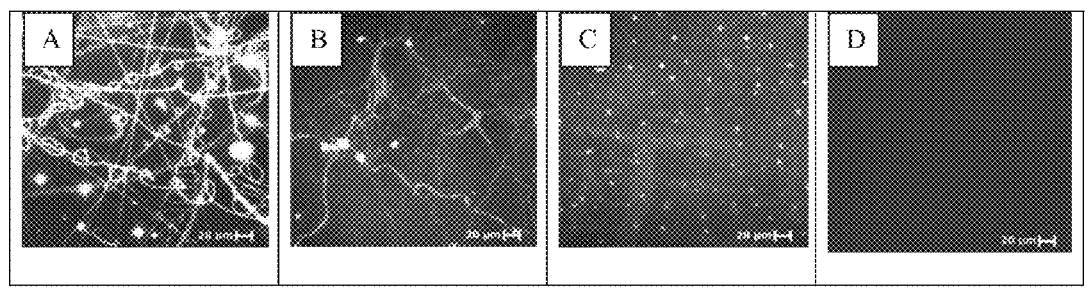
FIG. 24 shows fluorescence micrographs of cross-linked PLEY fibers on ITO-PET (indium tin oxide—polyethylene teryphthalate) electrospun at 50%0, (w/v). Fluorescein isothiocyanate-poly(L-lysine) (FITC-PLL) was deposited as in layer-by-layer assembly. (A) Sample incubated with 2 mg/mL FITC-PLL for about one hour and rinsed with DI. (B) Sample incubated with 5 mg/mL FITC for about one hour and rinsed with DI. (C) Sample incubated with 5 mg/mL FITC for about one hour and rinsed with DI. (D) Sample rinsed with DI. All micrographs were obtained with a 10× objective lens. The scale bar is 20 µm in each case.

FIG. 24 shows physical characterization of electrospun fibers made from a 50% (w/v) aqueous PLEY solution. Fibers were visualized by fluorescence microscopy at 10× magnification. Fluorescein isothiocyanate-poly(L-lysine) (FITC-PLL) was deposited by layer-by-layer assembly. (A) 2 mg/mL FITC-PLL adsorbed for about one hour on fibers collected on 60 W/ft² indium-tin-oxide (ITO) and rinsed extensively with water, (B) 2 mg/mL FITC-PLL adsorbed for about one hour on fibers on ITO and rinsed extensively with water, (C) 5 mg/mL FITC adsorbed for about one hour on ITO and rinsed extensively with water, (D) fibers on ITO rinsed extensively with water.

Figure 14:
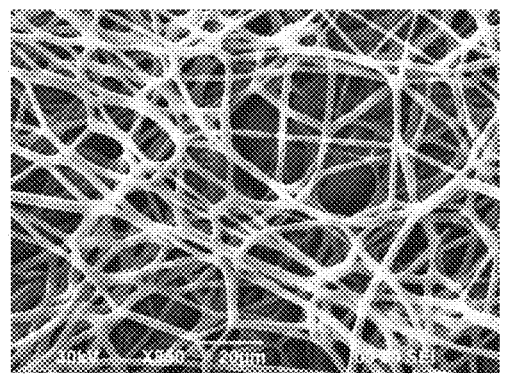
FIG. 14 shows an SEM image of an electrospun mats of fibrous polypeptides according to an embodiment of the present invention. The magnification is 850×, the scale bar is 20 µm, and the feed stock was PLEY 4:1.
Figure 15:
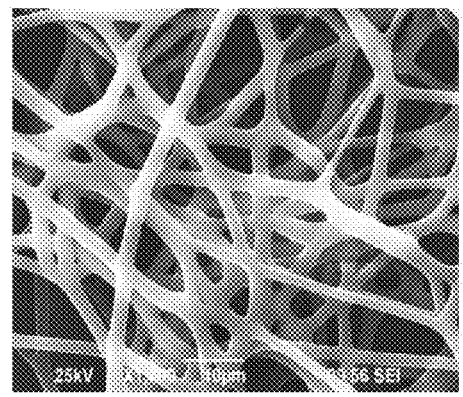
FIG. 15 shows an SEM image of an electrospun mat of fibrous polypeptides according to an embodiment of the present invention. The magnification is 1700×, the scale bar is 10 µm, and the feed stock was PLEY 4:1.

FIG. 14 shows an SEM image of an electrospun mat of fibrous polypeptides using a PLEY 4:1 aqueous solution. The magnification is 850×, the scale bar is 20 µm, and the applied voltage was 30 kV. FIG. 15 shows an SEM image of an electrospun mat of fibrous polypeptides using a PLEY 4:1 aqueous solution. The magnification is 1700×, the scale bar is 10 µm, and the applied voltage was 25 kV.

Figure 16:
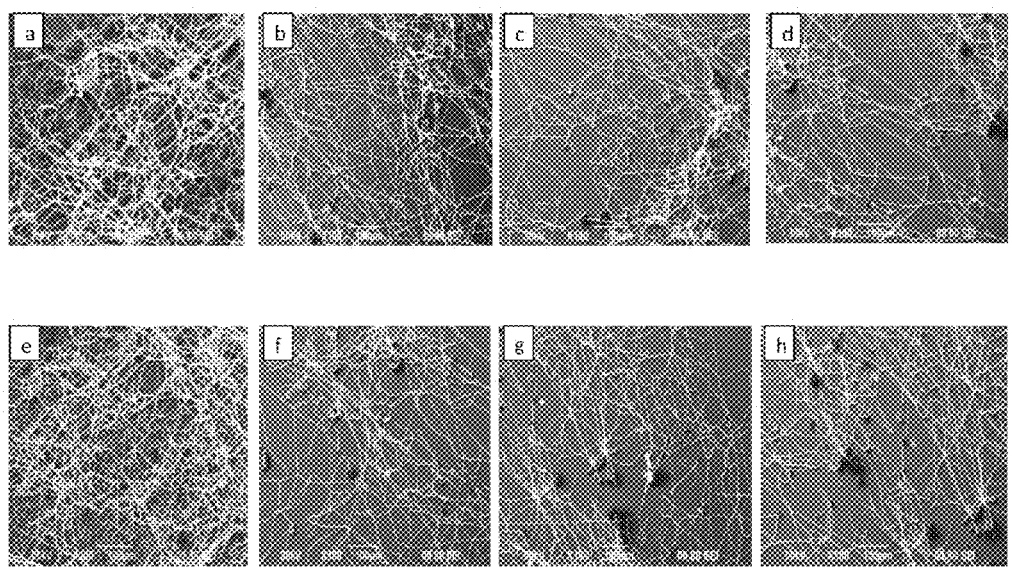
FIG. 16 shows protease digestion for an electrospun mat of fibrous polypeptides according to an embodiment of the present invention. (A)-(D) The protease is Glu-c protease (cat #90054 Thermo Scientific USA), incubation of about five hours at about 37° C., pH of about 8, with a 50 Mm ammonium bicarbonate buffer; the electrospun mat was made from a feed stock of PLEY 4:1. (E)-(H) The protease is protease XIV (cat # p5147, Sigma, MO, USA), incubation of about five hours at about 37° C., pH of about 7.4, with a 10 Mm phosphate buffer saline (PBS) buffer; the electrospun mat was made from a feed stock of PLEY 4:1. Magnification, scale bar, and percentage (w/v) of protease: (A) 330×, 50 µm scale bar, 0% protease; (B) 160×, 100 µm scale bar, 0.002% protease; (C) 180×, 100 µm scale bar, 0.02% protease; (D) 180×, 100 µm scale bar, 0.2% protease; (E) 200×, 100 µm scale bar, 0% protease; (F) 180×, 100 µm scale bar, 0.002% protease; (G) 160×, 100 µm scale bar, 0.02% protease; (H) 180×, 100 µm scale bar, 0.2% protease.

FIG. 16 shows protease digestion for electrospun mats of polypeptide fibers prepared from a feedstock of a PLEY 4:1 aqueous solution. (A)-(D) The protease is Glu-c protease (cat #90054 Thermo Scientific USA), incubation of about five hours at about 37° C., pH of about 8, with a 50 Mm ammonium bicarbonate buffer; the electrospun mat was made from a feed stock of PLEY 4:1. (E)-(H) The protease is protease XIV (cat # p5147, Sigma, MO, USA), incubation of about five hours at about 37° C., pH of about 7.4, with a 10 Mm phosphate buffer saline (PBS) buffer; the electrospun mat was made from a feed stock of PLEY 4:1. Magnification, scale bar, applied voltage, and percentage (w/v) of protease: (A) 330×, 50 μm scale bar, 30 kV, 0% protease; (B) 160×, 100 μm scale bar, 30 kV, 0.002% protease; (C) 180×, 100 μm scale bar, 30 kV, 0.02% protease; (D) 180×, 100 μm scale bar, 30 kV, 0.2% protease; (E) 200×, 100 μm scale bar, 25 kV, 0% protease; (F) 180×, 100 μm scale bar, 30 kV, 0.002% protease; (G) 160×, 100 μm scale bar, 30 kV, 0.02% protease; (H) 180×, 100 μm scale bar, 30 kV, 0.2% protease.

Figure 17:
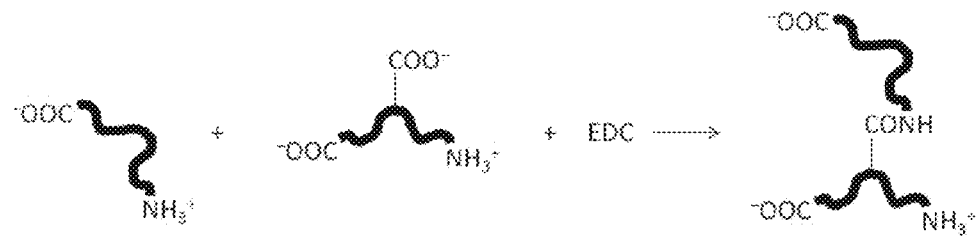
FIG. 17 shows a cross-linking scheme for a PLEY 4:1 fiber.
Figure 25:
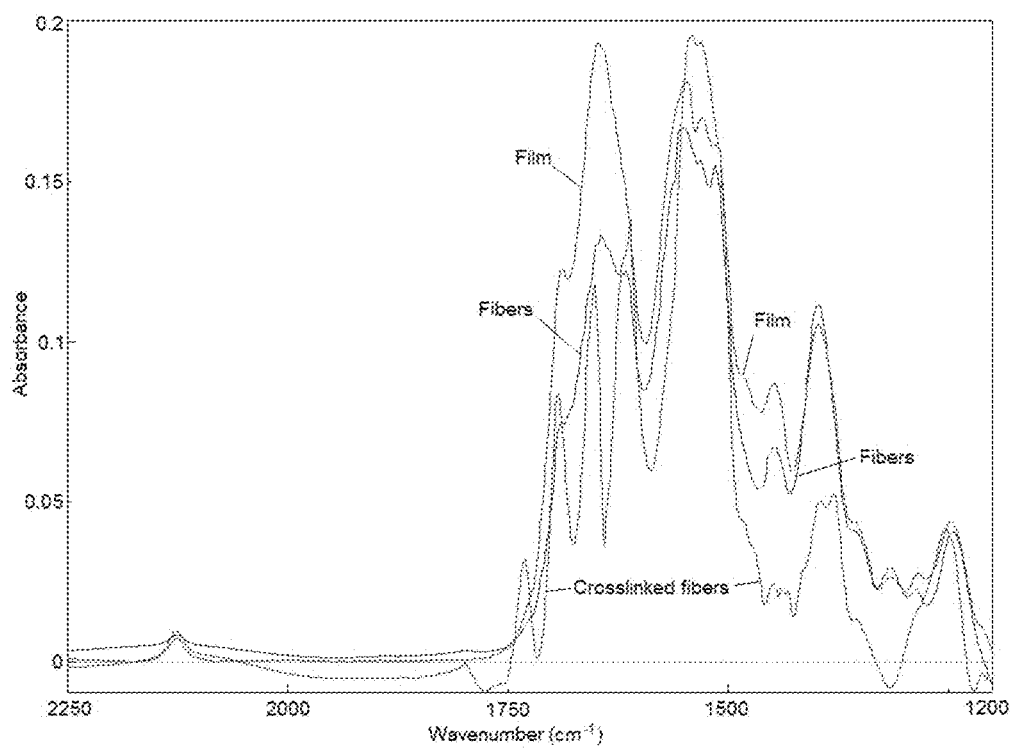
FIG. 25 shows in situ FTIR spectra of an as-cast film and electrospun fibers of PLEY on ITO-PET before and after cross-linking. The spectra were obtained in ATR mode.

FIG. 17 shows a cross-linking scheme for a PLEY 4:1 fiber. Water-soluble PLEY nanofibers were made insoluble by cross-linking with EDC in ethanol (see also FIG. 13C). EDC reacts with a carboxyl group in a glutamic acid side chain in the second peptide on the left, forming an amine-reactive O-acylisourea intermediate (not shown). If the intermediate reacts with the amino-terminal amino group on the first peptide on the left, the two peptides become joined by an amide bond, as shown on the right. EDC could join a side chain to the amino-terminus of the same peptide. The results of the cross-linking of PLEY in EDC-ethanol at various cross-linking and dissolution times are shown in Table 9. Cross-linking significantly altered the mechanical properties and stability of the nanofibers. FIG. 25 shows in situ FTIR spectra of an as-cast film and electrospun fibers of PLEY on ITO-PET before and after cross-linking. The spectra were obtained in ATR mode.

TABLE 9

Cross-linking and dissolvability of PLEY in EDC-ethanol.

| Cross-linking time (h) | Dissolution time (h) | Result |
| --- | --- | --- |
| 0.25 | 0.25 | Total dissolution |
| 0.5 | 0.5 | Partial dissolution |
| 1.0 | 1.0 | Partial dissolution |
| 6.0 | 12, 24, 48 | No dissolution |
| 12 | 12, 24, 48 | No dissolution |
| 24 | 12, 24, 48 | No dissolution |

Figure 19:
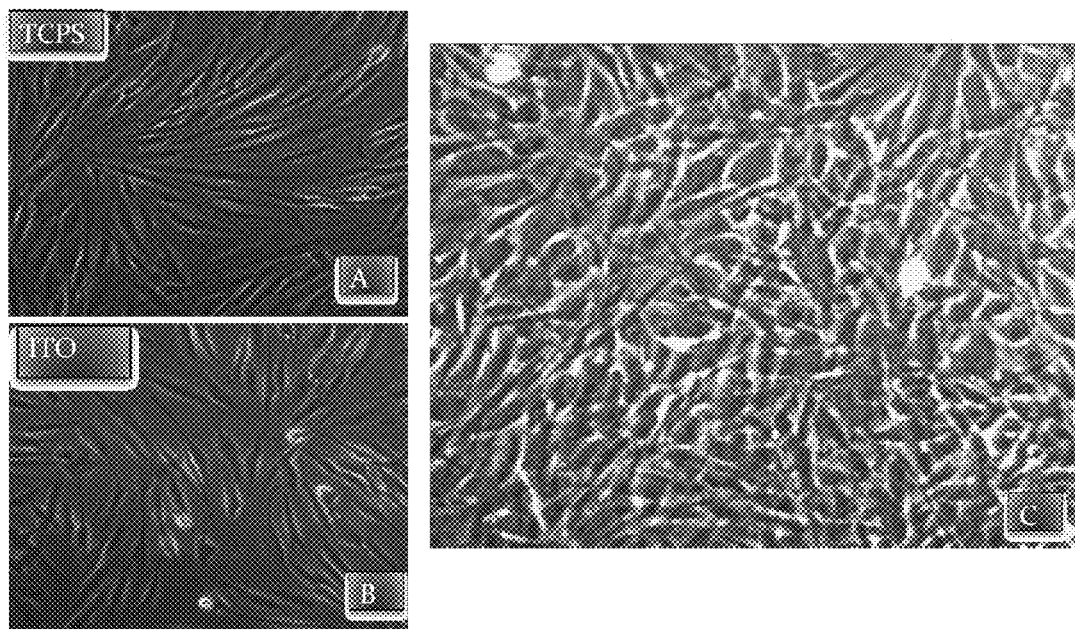
FIG. 19 shows cell cultures of an electrospun mat of fibrous polypeptides according to an embodiment of the present invention. (A) is on tissue culture polystyrene (TCPS), (B) is on ITO, and (C) shows EDC-cross-linked electrospun PLEY on ITO-PET. The electrospun mat was made from a feed stock of PLEY 4:1.
Figure 22:
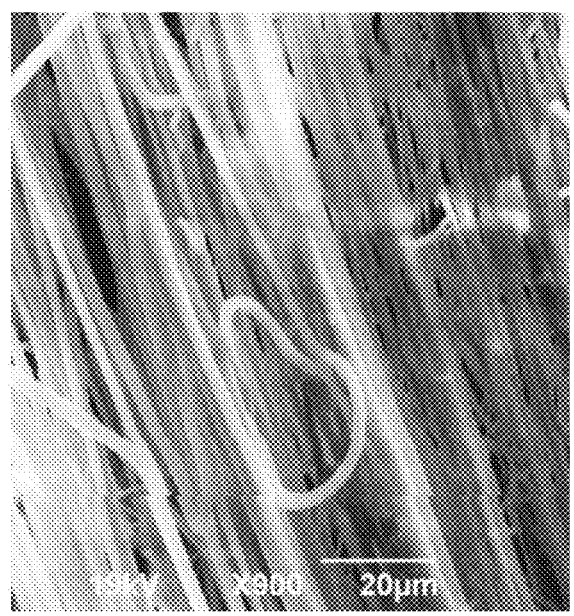
FIG. 22 shows an SEM image of an electrospun mat of aligned fibrous polypeptides according to an embodiment of the present invention. The magnification is 900×, the scale bar is 20 µm, the voltage was 19 kV, and the feed stock was 55% (w/v) PLEY 4:1.

FIG. 19 shows cell cultures of an electrospun mat of fibrous polypeptides made from a PLEY 4:1 aqueous solution. (A) is on TCPS, (B) is on ITO, and (C) is EDC-cross-linked electrospun 55% PLEY on ITO-PET. FIG. 22 shows an SEM image of an electrospun mat of aligned fibrous polypeptides made from a 55% (w/v) PLEY aqueous solution. The magnification is 900×, the scale bar is 20 μm, and the voltage was 19 kV.

Example 14—PLEY

Lyophilized PLEY 4:1 was dissolved in deionized water (DI) at a concentration of 55% (w/v). The solution was then deposited directly onto indium-tin-oxide-coated plastic and allowed to air dry (black spectrum in FIG. 18) or electrospun onto indium-tin-oxide-coated plastic (red spectrum in FIG. 18). The fibers were subsequently cross-linked with EDC, a common coupling reagent that is reactive towards carboxylate groups (blue spectrum in FIG. 18). All samples were analyzed in situ with a Jasco FT/IR-4100LE instrument and a Harrick Horizon ATR accessory outfitted with a ZnSe crystal. 256 data sets were collected at a bandwidth of 4 cm-t and averaged in each case.

FIG. 18 shows absorbance vs. wavenumber (cm$^{-1}$) for the cast from solution (black spectrum), the fiber (red spectrum), and the EDC-fiber (blue spectrum). PLEY was apparently mostly disordered in the fibers prior to cross-linking. The cross-linking process apparently induced the peptides to become more ordered in the fibers. Peaks 1-5, which represent different chemical groups, are useful for comparison. Peak 1, for instance, corresponds to the symmetric stretch of COO$^-$.

Example 15—3T3 Cells

FIG. 21 shows reproducibility and layer dependence of NIH 3T3 cell proliferation on non-functionalized synthetic biomatrix. The synthetic biomatrix was prepared from polypeptides by layer-by-layer assembly. Cell count was determined by a fluorescence-based assay 72 hour post seeding in 96-well plates at 10,000 cells per well. Data are shown for 0-12 layers of peptide. Blue (red) bars, odd (even) number of layers. PLL=poly(L-lysine), PLGA=poly(L-glutamate), MW=molecular weight. MMW-MMW="medium" MW PLL/"medium" MW PLGA. MMW-LMW="medium" MW PLL/"large" MW PLGA. MMW PLL=15-30 kDa. MMW PLGA=15-50 kDa. LMW PLGA=50-100 kDa. Averages of 24 independent trials and standard errors are shown. One asterisk indicates significance at p<0.05 relative to 0-layer control; two asterisks, p<0.01. This example does not demonstrate electrospun nanofibers.

Example 16—PLO and PLEY

Figure 23:
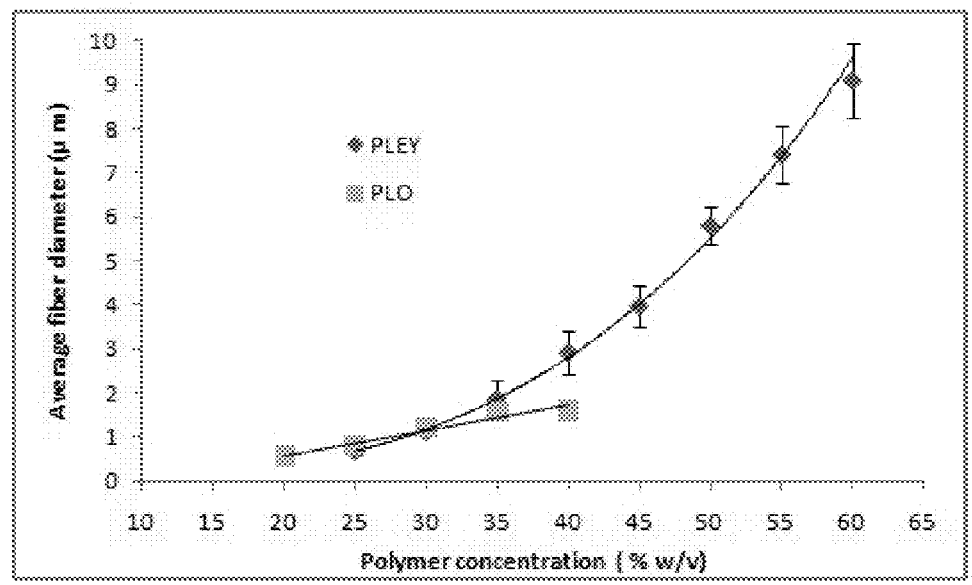
FIG. 23 shows fiber diameter as a function of polymer feedstock concentration for PLO and PLEY (diamonds—PLEY, squares—PLO).

FIG. 23 shows fiber diameter as a function of polymer feedstock concentration for PLO and PLEY (diamonds—PLEY, squares—PLO). Applied voltage and spinneret-collector distance were held constant. The values were 10 cm and 12 kV for PLEY and 10 cm and 10 kV for PLO. Each data point represents the average of 20 independent measurements. The error bars represent standard deviations.

Example 17—Cross-Linked PLEY Fibers

FIG. 17 shows a cross-linking scheme for a 4:1 PLEY fiber. FIG. 24 shows fluorescence micrographs of cross-linked PLEY fibers on ITO-PET (indium tin oxide-polyethylene teryphthalate) electrospun at 50% (w/v). The applied voltage was 10 kV, the spinneret-collector distance 9 cm. FITC-PLL was deposited by layer-by-layer assembly. A) Sample incubated with 2 mg/mL FITC-PLL for 1 h and rinsed with deionized water. B) Sample incubated with 5 mg/mL FITC for 1 h and rinsed with deionized water. C) Sample incubated with 5 mg/mL FITC for 1 h and rinsed with deionized water. D) Sample rinsed with deionized water. All micrographs were obtained with a 10× objective lens. The scale bar is 20 μm in each case.

Example 18—NCAs

FIG. 28 shows a scheme of synthesis for α-amino acid N-carboxyanhydrides (NCAs). Tyrosine, glutamic acid and lysine are shown as examples. FIG. 29 shows a scheme of synthesis for random copolymerization of NCAs. A tyrosine-lysine-glutamic acid tripeptide is shown as an example.

Example 19—Fibroblasts

Figure 30:
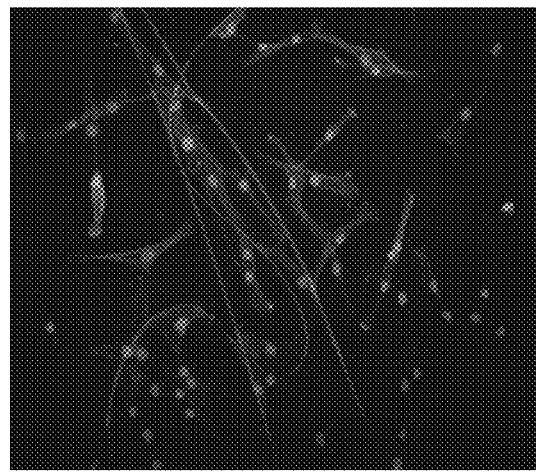
FIG. 30 shows a fluorescence micrograph of fibroblasts in vitro. F-actin was stained with rhodamine-phalloidin, nuclear DNA with DAPI, and poly(Glu, Tyr) fibers with FITC-poly(L-lysine) after EDC cross-linking.

Fibroblasts were cultured on electrospun polypeptide fibers in vitro. FIG. 30 shows a fluorescence micrograph of fibroblasts in vitro. F-actin was stained with rhodamine-phalloidin, nuclear DNA with DAPI, and poly(Glu, Tyr) fibers with FITC-poly(L-lysine) after EDC cross-linking.

Example 20—PLEY

PLEY 4:1 [or poly(L-Glu$_4$-co-L-Tyr$_1$); E=Glu, Y=Tyr in single-letter code], 20-50 kDa by viscometry, was obtained from Sigma-Aldrich (USA). Indium tin oxide-coated polyethylene terephthalate, 60 Ω/in$^2$ surface resistivity (ITO-PET), was obtained from Sigma-Aldrich. This substrate material is particular useful for use as a fiber collector because it is both conductive and semi-transparent in the visible range. 1 mL plastic syringes were obtained from Fisher (USA). Blunt-tip metal needles of inner diameter 0.6 mm were obtained from Jensen Global (USA). A PS/FX20P15-11 Glassman High-Voltage Inc. (USA) power supply was used to create jets of polymer feedstock.

Lyophilized PLEY was dissolved in deionized water (DI) at 60% (w/v), a concentration close to the solubility limit, and serially diluted with water. Fibers were spun from the polymer feedstock in a syringe; a blunt-tip needle served as the spinneret. The feedstock flow rate was otherwise determined by solution viscosity and gravity. A copper wire connected the cathode of the voltage source to the needle tip. The collector was connected to the same ground as the anode of the power supply. The applied voltage and the spinneret-to-collector distance were varied from 7 to 20 kV and 5 to 15 cm, respectively. All fiber production was done at ambient temperature, pressure, and humidity. Fibers were produced when conditions supported the formation of a Taylor cone and a jet of polymer solution. The solvent in the jet evaporated as it sped towards the collector, leaving mostly dehydrated fibers. Further dehydration was achieved by the gentle flow of air across the fibers. Oriented fibers were produced by connecting the power supply ground to a parallel plate collector, assembled from two 5 cm-long copper electrodes separated by a distance of 2 cm. All other conditions were the same as for fibers spun onto a planar collector.

Preliminary visualization of fibers on planar collectors was done with a Zeiss Axiovert 200M inverted microscope (Germany). The instrument was equipped with an incandescent source, a mercury vapor source, a filter set and a Roper Scientific MicroMAX System CCD camera (USA). Higher resolution images were obtained with a JEOL JSM-6390LV scanning electron microscope (SEM, Japan). The accelerating potential was 15-30 kV. Samples were metalized with a 10-nm layer of gold. Fiber diameter was determined by analysis of SEM data.

PLEY fibers were chemically cross-linked by submersing samples on 4 cm×4 cm ITO-PET substrates in 20 mL of 50 mM 1-ethyl-3-(3-dimethylaminopropyl) carbodiimide (EDC) (Thermo Scientific, USA) in 90% ethanol/10% DI at ambient temperature. This water-soluble reagent, which is common in biochemistry and indeed in protein electrospinning, activates carboxyl groups for spontaneous reaction with primary amines. There are in every PLEY molecule one carboxyl group per glutamic acid side chain, one carboxylic acid group at the carboxyl terminus of the polymer chain, and one amino group at the amino terminus. The duration of the cross-linking reaction was in a range of from 0 hours to 6 hours. Cross-linked samples were rinsed extensively with DI prior to further analysis or cell culture.

Cross-linked fibers were visualized by SEM as described above or fluorescence microscopy following adsorption of dye-conjugated peptides. Fiber samples on 2 cm×2 cm ITO-PET were fully immersed for about 1 hour in 2 mg/mL fluorescein isothiocyanate (FITC)-PLL (Sigma) in DI or 5 mg/mL FITC (Sigma) in DI and then rinsed with DI. Samples and controls were then analyzed with a fluorescence microscope equipped with a fluorescein filter set.

PLEY structure was analyzed by circular dichroism spectroscopy (CD) and Fourier-transform infrared spectroscopy (FTIR). An Aviv 215 CD instrument (Aviv Biomedical, Inc., USA) was used to obtain far-UV dichroic spectra of PLEY dissolved in deionized water. 15 scans were averaged for measurement in the 180-260 nm range at a rate of 1 nm s$^{-1}$, a step size of 1 nm, a path length of 0.1 cm, and a bandwidth of 1 nm. Minor data averaging was done to obtain the final spectrum. A Jasco FT/IR 4100 spectrometer (Japan) outfitted with a Horizon™ multiple-reflection attenuated total reflection (ATR) accessory with a ZnSe crystal (Harrick Scientific Products, Inc., USA) was used to analyze PLEY films and fibers. ZnSe transparency is approximately independent of wavelength in the range 1200-4000 cm$^{-1}$. Samples were analyzed in situ as polymer deposited directly from solution or as fiber mats on ITO-PET, before and after cross-linking. All spectra were acquired as 256 scan averages at a resolution of 4 cm$^{-1}$. Enzymatic degradation of cross-linked fiber mats was tested with two protease species. Lyophilized Glu-C endoproteinase (Thermo Scientific) was reconstituted at a concentration of 0.2% (w/v) in 50 mM ammonium bicarbonate, pH 8.0, and successive 10-fold dilutions were prepared with the same buffer. Lyophilized protease XIV (Sigma) was reconstituted at 2% (w/v) in phosphate-buffer saline (PBS), and successive 10-fold dilutions were prepared with the same buffer. ITO-PET substrates covered with cross-linked fiber mats were divided into 6 equal areas, 2 cm×2 cm each. 20 µL of enzyme solution or buffer was then deposited on the corresponding sector of fiber mat and incubated at 37° C. for a time in a range of from 0 hours to 5 hours. The resulting samples were rinsed with DI, dried and analyzed by SEM as described above.

Cytocompatibility of cross-linked PLEY fibers has been tested with normal human dermal fibroblasts (NHDFs). These cells, which have a normal phenotype, play an important role in wound healing in vivo. Such considerations are relevant to possible biomedical applications of electrospun biomaterials. Cells were maintained at a sub-confluent density in Fibroblast Basal Medium with Fibroblast Growth Medium-2 (Lonza, USA) and passaged every 72-96 hours. ITO and electrospun fiber mats on ITO-PET were rinsed in ethanol and then PBS prior to cell seeding. Cells cultured on tissue-culture polystyrene were rinsed in Hanks' balanced salt solution, released from the substrate by treatment with 0.25% trypsin in 2.21 mM EDTA (Mediatech, USA), centrifuged and re-suspended in culture medium. Approximately 10,000 cells in 200 µL were seeded onto ITO-PET or fiber-coated ITO-PET and then incubated at 37° C. and 5% $CO_2$. The culture medium was changed every about 48 hours.

PLEY was not spinnable at concentrations below 20% (w/v). Fibers produced in the 20-35% concentration range contained beads; the fibers were not smooth and continuous. At 50-60%, fibers were continuous, long and suitable for mat production. Less attractive fibers were obtained with 40-45% PLEY. The spinneret-collector distance and the applied voltage were tested at 3 or more values in the 5-15 cm and 7-20 kV range for each polymer concentration; the electric field was ~10$^3$ Vm$^{-1}$. The most attractive fibers were obtained at 50-55% PLEY, 12 kV and 10 cm.

FIGS. 14, 15, and 22 present typical SEM images of fibers electrospun at 55% PLEY. FIGS. 14 and 15 show non-woven fiber mats on a planar ITO collector at different magnifications. FIG. 22 presents aligned fibers obtained with the parallel-plate collector described above. In both cases, the fibers are smooth and bead-free. The average fiber diameter, determined by analysis of SEM images, was 670 nm-9.10 µm, depending on polymer concentration (FIG. 23). In general, the variance in fiber diameter increased as the mean value increased. At 55%, the average diameter was 7±1 µm.

PLEY fiber solubility has been tested at different pH values, above and below the $pK_a$ of glutamic acid. This amino acid accounts for 4 in 5 of all residues of PLEY. Side chain ionization was considered relevant because it strongly influences polymer solubility. In the absence of cross-linking, fibers were sensitive to water throughout the tested range, pH 2 (below the $pK_a$ of Glu) to pH 12 (above the $pK_a$ of Tyr), and at high humidity (similar to FIG. 13). Cross-linking was achieved by immersing fiber samples in EDC in ethanol/water at room temperature for defined periods of time. Resistance of fiber mats to dissolution in water was determined after cross-linking. About six hours of cross-linking was sufficient for essentially complete fiber mat insolubility. The results of the cross-linking and solubility tests are summarized in Table 10.

TABLE 10

Cross-linking and Solubility Results

| Cross-linking time (h) | Dissolution time (h) | Result |
|---|---|---|
| 0.25 | 0.25 | ~100% |
| 0.5 | 0.5 | <75% dissolution |
| 1.0 | 1.0 | <25% dissolution |
| 6.0 | 12, 24, 48 | <5% dissolution |

Table 2. Result of fiber mat crosslinking and solubility tests. The duration of fiber mat exposure to crosslinking reagent and to water are given.

PLL-FITC has been used to visualize fiber mats by fluorescence microscopy. PLL-FITC (FIG. 24A) but almost no free FITC (FIG. 24B) became bound to PLEY molecules in fiber mats during incubation and remained bound following extensive rinsing with deionized water. The binding process resulted in essentially no change in fiber diameter. Any FITC that became bound to ITO-PET did so at an approximately uniform surface density (FIG. 24C). Fibers on ITO could not be visualized by fluorescence microscopy in the absence of a dye (FIG. 24D).

CD has been used to gain information on PLEY structure in solution. The preferred backbone conformation in aqueous solution was a random coil. FTIR-ATR has been used to demonstrate fiber crosslinking and assess PLEY structure in fibers before and after cross-linking. Referring to FIG. 25, the spectra of the polymer cast from solution and in fibers before crosslinking showed only relatively minor differences with regard to shape of the absorption envelope. Cross-linking and rinsing led to a sharp decrease in line broadening, especially in the amide I region (1600-1700 $cm^{-1}$). The amount of water bound was nominally the same for all spectra.

Figure 31:
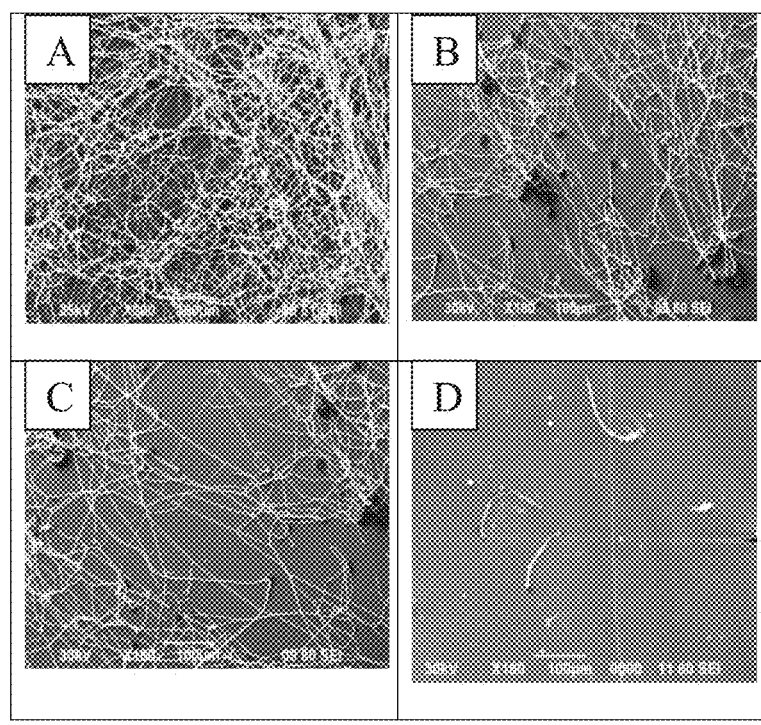
FIG. 31 shows SEM micrographs of cross-linked electrospun 55% PLEY fibers following proteolytic digestion for about five hours at 37° C. A) 0%, B) 0.002%, C) 0.02%, D) 0.2% (w/v) Glu-C protease in 50 mM ammonium bicarbonate buffer, pH 8. A) 200*, all others, 180×. The accelerating potential was 25 kV or 30 kV. The scale bar is 100 µm in each case.

The susceptibility of PLEY fibers to proteolysis has been tested. Fibers were incubated with reconstituted Glu-C protease or protease XIV for defined time periods. Degradation was evident in all fiber mats exposed to protease. Referring to FIG. 31, fragmentation of individual fibers increased with time. Fibers were almost completely degraded within five hours by 0.2% (w/v) Glu-C or 2% (w/v) protease XIV. 20-25% of the fibers remained in 0.02% Glu-C and 0.2% protease XIV after the same amount of time; 40-45% of the fibers remained in 0.002% Glu-C and 0.02% protease XIV.

Figure 26:
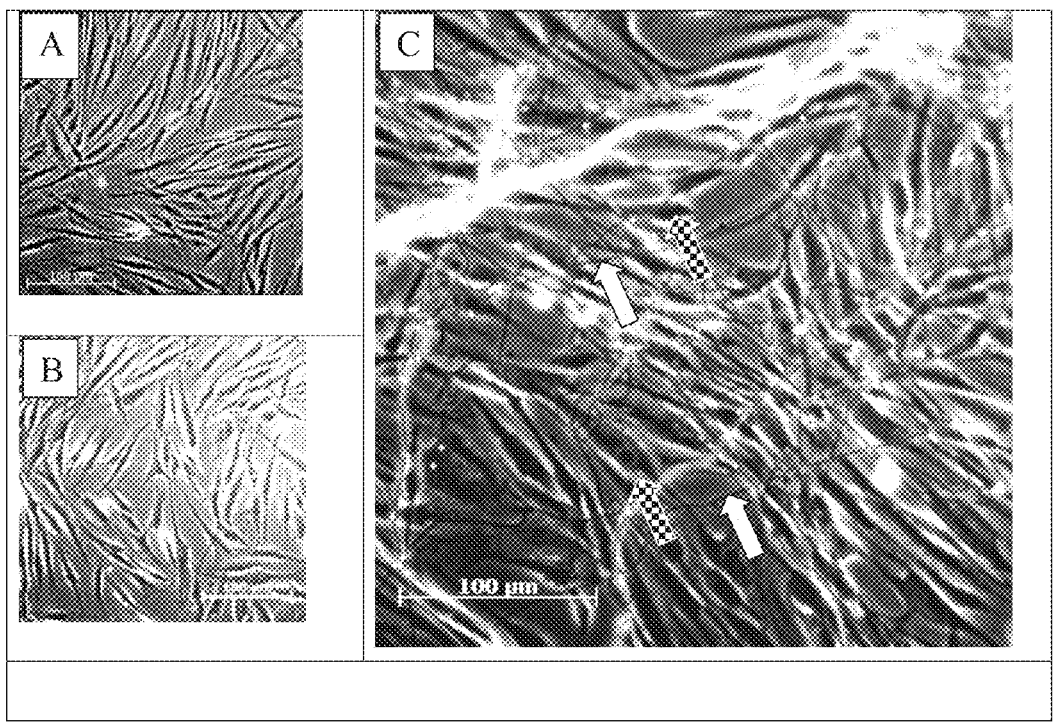
FIG. 26 shows light micrographs of normal human dermal fibroblasts (NHDFs) culture in vitro. The substrate was (A) tissue culture polystyrene, (B) ITO-PET, or (C) EDC-cross-linked electrospun 55% PLEY on ITO-PET. A 10× objective was used. White arrows highlight specific fibers, shaded arrows specific cells. The scale bar is 100 µm in each case.

Biocompatibility testing of PLEY fibers was performed. NHDF cells were seeded onto crosslinked fibers or onto control surfaces for introductory assessment of adhesion, morphology and toxicity. Referring to FIG. 26, cells became well spread within about 24 hours and grew to confluence within about 72 hours on tissue culture polystyrene, ITO-PET, and cross-linked PLEY fiber-coated ITO-PET. FIG. 26 shows light micrographs of normal human dermal fibroblasts (NHDFs) culture in vitro. The substrate was (A) tissue culture polystyrene, (B) ITO-PET, or (C) EDC-cross-linked electrospun 55% PLEY on ITO-PET. A 10× objective was used. White arrows highlight specific fibers, shaded arrows specific cells. The scale bar is 100 µm in each case. Randomly-oriented fibers were spaced on the order of microns to tens of microns. Fiber diameter varied from hundreds of nanometers (darker fibers) to microns (bright fiber). Cells displayed apparently normal adhesion and morphology on fiber-coated ITO by light microscopy.

Example 21—Synthesis of α-Amino Acid NCAs

In a dry two-neck round-bottom flask outfitted with a reflux condenser and a nitrogen inlet, side-chain protected α-amino acid in dry tetrahydrofuran (THF) can be added under a nitrogen atmosphere. The suspension can be heated to 70° C. for 10 min. Triphosgene (0.33 equivalents) can be dissolved in dry. THF can then be added drop-wise to the suspension for about 30 min at 70° C. The reaction mixture can then be stirred at 70° C. until a clear solution is obtained. This material can be allowed to cool to ambient temperature and transferred to a flask to which hexane is added until the solution turns turbid. This mixture can then be maintained at −20° C. for recrystallization overnight. White crystals collected by filtration and vacuum drying can then be characterized.

Example 22—Synthesis of Random Copolymers

The initiator diethylamine can be added to a mixture of amino acid monomers, e.g. benzyloxy-L-glutamate-NCA, benzyloxy-L-tyrosine-NCA and N-CBz-lysine-NCA, under a nitrogen atmosphere in a flame-dried Schlenk tube. The mixture can be stirred at 60° C. under nitrogen for about 48 hours. Methanol can be added to precipitate the polymers, which can then be washed with methanol and vacuum dried to yield white solids. For Sub-project A peptides (see Table 6), random peptide synthesis can be carried out by NCA polymerization initiated by hydroxide, and oligopeptides prepared by solid-phase synthesis can be coupled to the random peptides in the solution-phase by carbodiimide coupling. The AB to $A_1B_1$ coupling in the solution phase can promote random incorporation of distinct sequences in an otherwise random polypeptide chain.

Deprotection of copolymer side chains—Polypeptides can be dissolved in a mixture of dry THF and methanol (9:1), and Pd/C powder can be added to 10% (w/v). The reaction mixture can then be hydrogenated at 50° C. for about 36 hours. The reaction mixture can then be filtered, and the filtrate can be evaporated and vacuum dried, yielding deprotected random copolymers.

Materials characterization—Amino acids and polypeptides can be characterized with a Reflex II matrix-assisted laser desorption-ionization mass spectrometer (Bruker Daltonics), and $^1H$- and natural abundance $^{13}C$-spectra can be obtained with a DPX 250 MHz (Bruker) or an Inova 400 MHz or 500 MHz (Varian) NMR spectrometer. Peptide solubility can be assessed as turbidity versus peptide molality. A size-exclusion chromatograph (Shimadzu), equipped with a refractive index detector and a Waters Styragel® HR 4E column, and a Malvern Zetasizer Nano S can be used to determine the molecular weight of synthesis products, based on comparisons with mass and size standards.

Example 23—Testing, Cross-Linking, and Characterization

For fibers produced from soluble peptides from Example 22, peptide concentration can be tested in the range of 5-50% (w/v), and the electric field strength, $10^4$-$10^6$ V/m, in 10 increments for each. Fibers can be collected continuously at ambient temperature for 30 min on 60 $\Omega/in^2$ indium tin oxide-coated polyester (ITO-PET; Sigma-Aldrich), a material that is advantageous because it is transparent, conductive, suitable for in vitro cell culture and inexpensive.

Fiber cross-linking—Fibers made of cysteine-containing peptides (Table 6, Sub-project B) can be cross-linked as follows. The corresponding peptides can be dissolved in nitrogen gas-saturated buffer to inhibit disulfide formation. Exposure of fibers to the oxidizing potential of air during and after spinning will promote disulfide bond formation. Fibers of the peptides in Sub-projects A and C of Table 6 can be treated with glutaraldehyde vapor as in Khadka and Haynie (2010) (which is hereby incorporated by reference in its entirety) or EDC (carbodiimide) in 90% ethanol/10% water, cross-linking respectively amino groups or carboxylate groups. Fiber mat solubility can be assessed as the time dependence of percentage change in dry mass.

Fiber characterization—Fiber diameter and mat morphology can be characterized by scanning electron microscopy after sputter coating a 10 nm layer of gold. It is anticipated that fiber diameter will be in the 0.1-2 µm range, depending on peptide degree of polymerization, concentration, and other variables, as in Khadka and Haynie (2010). Fiber mats can also be analyzed by IR spectroscopy in attenuated total reflectance mode on a ZnSe crystal over the range 4000-1000 $cm^{-1}$ in the laboratory of the PI, to gain information on secondary structures adopted by peptides in fibers.

Alternative approaches—If a candidate peptide that is soluble should prove difficult to electrospin, its structure can be altered. All Sub-project A and Sub-project C peptide designs from Table 6 that prove spinnable can be reformulated to include cysteine as in Sub-project B of Table 6 in an attempt to produce fibers that can be cross-linked by disulfide bonding. For instance, Orn:Gly:Pro::2:1:1 can go to Orn:Gly:Pro:Cys::12:6:6:1. This activity cam illustrate a way in which control over amino acid composition enables "tunability" of fiber mat properties.

Example 24—Testing

Fibers mats can be tested in vitro for susceptibility to proteolysis and suitability for mammalian cell culture, and in vivo. All spinnable peptides from Example 23 can be tested in vitro and/or in vitro.

Proteolysis—Trypsin (Sigma) can be prepared as a 1% (w/v) aqueous stock solution, serially diluted and deposited onto different fiber mat samples on ITO-PET at 37° C. for at least 5 min. The negative control can be buffer in the absence of trypsin. At defined time points, the fiber mats can be rinsed thoroughly with water and dried, and the time dependence of percentage change in dry mass will be calculated.

Cell culture—Keratinocytes (Lonza) and primary human umbilical vein endothelial cells (HUVECs) can be cultured on fiber mat samples on ITO-PET, and on bare ITO-PET and bare tissue culture poly(styrene). HUVECs (Lonza), for example, can be cultured in EGM® endothelial serum-free growth medium (Lonza) supplemented with EGM-Bullet-Kit® [Lonza; bovine brain extract with heparin, hEGF, hydrocortisone, GA-1000 (gentamicin, amphotericin B) and 2% fetal bovine serum]. The culture medium can be changed every 2 days until cells are confluent. The cells cannot have been passaged more than 5 times before seeding onto fiber mats or control surfaces, nor will they have been exposed to vascular endothelial growth factor (VEGF).

Cell adhesion, morphology, and proliferation in vitro.— For short-term cell adhesion experiments, cells can be incubated for about 2 hours at 37° C. and 5% $CO_2$. Cell adhesion can then be quantified with the Vybrant™ cell adhesion assay kit (Molecular Probes™ Invitrogen). For HUVECs, $1\times10^5$ cells can be allowed to attach to hole-punch-sized, nanofiber-coated substrates for 24 h, fixed in 4% (w/v) paraformaldehyde in PBS, and permeabilized with 0.1% (v/v) Triton X-100 in PBS. F-actin, cell-substrate contacts and cell-cell contacts can be stained with rhodamine phalloidin (Molecular Probes™), FITC-labeled anti-vinculin (Sigma-Aldrich), and anti-human VE-cadherin/CD144-PE (R&D Systems), respectively. Nonspecific background staining can be reduced by treating samples with 1% (w/v) BSA in PBS prior to staining. DAPI (Molecular Probes™) can be the fluorescence counterstain. Cell samples can be analyzed with the Leica DM2000 fluorescence microscope in the Florida Center of Excellence for Biomolecular Identification of Targeted Therapeutics (see also FIG. 30). The instrument is equipped with an external light source, a digital camera, and a 100× oil-immersion objective. In cell proliferation experiments, the number of adhered cells can be measured with the CyQuant® NF cell proliferation assay kit (Molecular Probes™; C35006) after 1, 3, or 7 days of culture. Fluorescence intensity can be measured at ambient temperature with a Wallac 1420 VICTOR2 fluorescence microplate reader (PerkinElmer Inc., USA) with excitation at 485 nm and emission detection at 530 nm. Each set of conditions can be analyzed in at least two independent experiments, seven replicates per experiment. For HUVECs, effects of $VEGF_{165}$ (R&D Systems) on cell adhesion and proliferation on fiber mats can be determined as follows. Cells can be suspended in 10 ng/mL $VEGF_{165}$-containing culture medium and then seeded on fiber mats, ITO-PET, or tissue culture poly(styrene). For long-term cell proliferation experiments, the $VEGF_{165}$-containing culture medium can be changed every 2 days. Results can be compared with VEGF-untreated but otherwise identical cell samples. Cell data sets can be compared by Student's 1-test. p values <0.05 will be considered statistically significant.

In vivo open wound healing test—For each candidate peptide structure tested in vivo, the healing of wounds on 12 Sprague-Dawley rats, 6 males and 6 females, weighing 240±10 g each, can be studied. Anesthetization can be effected by intramuscular injection of ketamine (50 mg/kg) and xylazine (10 mg/kg) or an alternative, IACUC-approved formulation. Two full-thickness rectangular wounds of 1 cm×1 cm can be prepared on the back of each anesthetized rat, parallel with the spine. An electrospun nanofiber mat of the same size can be applied to one of the wounds, and cotton gauze of the same size to the other. On post-operative day 7 or 10, macroscopic photographic documentation of the wounds can be obtained, and the wound area can be measured with a slide caliper. On post-operative day 7 or 28, the wounds can be removed after euthanizing the rats by intramuscular injection of ketamine and xylazine and intravenous injection of KCl (3 mL/kg) for histological assessment of epithelialization and granulation or an alternative, IACUC-approved procedure.

Viscosity can be measured over a range of shear rates with a rheometer, such as a DV III (Brookfield, USA) using a rate or 300 s$^{-1}$. Different methods can be used to measure the surface tension of protein and peptide electrospinning feedstock solutions. In the pendant drop method, for example, contact angle is measured with a surface tension analyzer (Pheonix 300, SEO, Korea). A droplet of solution is observed until its shape reaches equilibrium. Surface tension is then calculated as $\gamma=g\Delta\rho d_e^2/H$, where g is gravitational acceleration, $\Delta\rho$ is difference in density between air and solution, $d_e$ is the equatorial diameter of the droplet, and H is a shape factor. Another approach is the Wilhelmy plate method, using, e.g., a Krüss Tensiometer K12. A platinum plate can be immersed in solution and removed at a constant speed. The force needed to remove the plate from solution can be measured for 1 min. This force is then converted to surface tension.

Conductivity—This measure of the ability of a solution to conduct electricity can be measured in different ways, such as using a conductivity flow cell or a conductivity meter (e.g., Accumet XL-20, Fisher Scientific, DDS-307A Shanghai Rex Instruments) conductivity meter).

Turbidity—This measure of solution cloudiness, or the ability of particles in solution to scatter light, is sometimes used to characterize polymer solubility. For ELPs, turbidity measurements can be made with a spectrophotometer equipped with a programmable Peltier cell and temperature control. Inverse temperature transitions, which represent the lowest critical solution temperatures of the polymer monitored in water, were measured at 280 nm in the range 0.5-0.7 mg/mL.

Polymer structure in solution—Methods used include circular dichroism (CD) spectroscopy, Fourier-transform infrared spectroscopy, and nuclear magnetic resonance spectroscopy. In the far UV, where electronic transitions are detected, CD can be used to obtain information on the average conformation on the polypeptide backbone. FTIR is used to obtain information on vibrational transitions. X-ray photoelectron spectroscopy can be used to quantify the elemental composition of a material. Optical polarizing microscopy can be used to visualize the morphology and detect the birefringence of fibers. Birefringence is due to a preferred orientation of molecules.

The extent of preferential ordering of molecules in fibers can also be measured by infrared dichroism. $D=A_{parallel}/A_{perpendicular}$. The orientation function $f=[(D_0+2)/(D_0-1)][(D-1)/(D+2)]$, where $D_0=2 \cot^2 \theta$=dichroic ratio for perfect alignment and $\theta$ is the angle between the transition moment vector for vibration and the local chain axis. $f=[3<\cos^2\theta>-1]/2$. $f=1$ is perfect uniaxial alignment of molecules in direction of fiber. $f=0$=absence of preferred orientation. $f=-\frac{1}{2}$ is alignment in plane transverse to fiber direction. The method assumes that a uniaxial model is sufficient to represent state of orientation in fibers.

FTIR—Transmittance, 128 scans, 4 cm$^{-1}$. FTIR can be used to collect spectra of silk fibroin in 1800-1400 cm$^{-1}$ range over 0-120 min of exposure to water following dessication. Structural changes on exposure to alcohol were measured as area ratios of silk II and silk I in amide I region (random coil to β sheet transition).

ATR-FTIR. 4 cm$^{-1}$ resolution, 32 scans, Savitzky-Golay filtering, user-defined baseline correction, deconvolution into Gaussian peaks. Crystallinity index of silk fibroin can be calculated as absorbance ratio between amide III peaks at 1265 and 1235 cm$^{-1}$. Mat can be collected on an aluminum mirror and analyzed in reflectance mode, 64 scans, 4 cm$^{-1}$, 4000-650 cm$^{-1}$.

Raman spectroscopy provides information on bond vibrations. Raman spectra of fibers can be obtained with, e.g., a Raman microscope, using 623.8 nm red line of He—Ne laser focused on sample. All secondary structures have characteristic bands. The approach is complementary to FTIR.

Wide angle X-ray diffraction can be used to determine the crystalline structure of polymers. The Bragg peaks are analyzed. Scattering of the Bragg peaks to wide angles implies that they are caused by sub-nanometer sized structures. Diffraction peaks can be assigned to lattice planes of crystalline material. It may be possible to shift proportions of peaks, depending on structure of material in fibers.

Differential scanning calorimetry can be used to analyze thermal properties of a sample. The mass of the sample is assumed constant.

Polymer structure can be determined by solid-state $^{13}$C NMR, as chemical shifts of carbon atoms are strongly related to secondary structure of beta-sheet conformation. Chemical shifts of Gly, Ser and Ala are indicative of beta sheet.

Contact angle formed between a droplet of liquid and a substrate can be measured to compare the hydrophilicity of different substrates.

Fiber Mat Dissolubility—Scaffold can be immersed in 37° C. DI water, 1:100 mass ratio for 1 h. Water dissolved rate (%)=$(W_0-W)\times 100/W_0$, where $W_0$ is the mass of scaffold before dissolving and W is mass after dissolving.

Fiber Mat Water Content and Uptake—Thermogravimetric analysis measures the change in mass of a sample on changing the temperature. The mat can be weighed before and after heating at 85° C. for >3 days until no further change in mass is detected. Water absorption can then be obtained by weighing a mat before and after annealing at high relative humidity.

Fiber Mat Morphology—SEM or AFM can be used.

Fiber Mat Thickness can be measured with, e.g., a digital micrometer or a scanning interferometer.

Fiber Diameter can be determined by analysis of SEM data. Higher DP polymers can give thinner fibers at lower concentrations. There is better chain entanglement with longer polymers. Moreover, higher DP polymers give a narrower range of diameters. Fiber cross-section can be imaged by SEM after drying.

For Pore Area, Density and Porosity, many approaches make use of SEM data, Mercury intrusion method, Solid-state NMR, and/or diffusion measurement.

Fiber Alignment measurements can be done by FFT, which converts from real space to frequency space, distribution of grayscale values reflects degree of fiber alignment in original image. Randomly-oriented fibers give a symmetrical, circular pixel distribution after FFT, because the frequency of specific values of pixel intensity in image will be the same in any direction.

Fiber Mat Mechanical Characterization—the American Standards for Testing Methods ASTM D882-97 concerns tensile properties of thin plastic sheeting. HAAKE CABER 1 rheometer (Thermo Elecron Corp., USA) used for extensional rheological measurements, Hencky strain and apparent extensional viscosity calculated from variation in midpoint filament diameter with time. Stress is a measure of the average force per unit area of a surface within a body on which internal forces act. Strain is a normalized measure of the displacement between particles in the body relative to a reference length. For example, tensile strain is a measure of crosshead displacement (in units of length) divided by the original length, or gauge length. The stress-strain curve of a material is obtained from load-deformation data. Young's modulus is the tangent modulus of the initial, linear portion of the stress-strain curve. Also known as the tensile modulus, the elastic modulus and the preliminary modulus. Young's modulus is defined as the ratio of the uniaxial stress over the uniaxial strain in the range of stress in which Hooke's law holds (the material has not been stretched beyond the elastic limit). Elongation at break, or tensile elongation, is the measured length at the moment of rupture. This quantity is often expressed as a percentage of the original length: Elongation (%)=$(L_1-L_0) \times 100/L_0$, where $L_0$=length of original sample (gauge length) and $L_1$ is length at break. Tensile strength is the maximum load that a material can support without fracture when being stretched, divided by the original cross-sectional area of the material. It is also called the breaking strength or ultimate strength. Uniaxial materials testing is done to determine mechanical material properties that are related to forces acting on bodies along a single axis. All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

Agarwal, S., Wendorff, J. H. and Greiner, A. (2008) Use of electrospinning technique for biomedical applications, *Polymer* 49:5603-5621.

Blout, E. R. and DesRoches, M. E. (1959) Preparation of high-molecular-weight polypeptides, *J. Am. Chem. Soc.* 81:370-372.

Blout, E. R. and Karlso, R. H. (1956) The synthesis of high molecular weight poly-□-benzyl-L-glutamates, *J. Am. Chem. Soc.* 78: 941-946.

Bowlin, G. L., Wnek, G., Simpson, D. G. and Terracio, L. (2003) Engineered muscle, U.S. Pat. No. 6,592,623.

Chen, Z., Mo, X. and Qing, F. (2007) Electrospinning of collagen-chitosan complex, *Mater. Lett.* 61:3490-3494.

Deng, C., Chen, X., Sun, J., Lu, T., Wang, W. and Jing, X. (2007) RGD peptide-grafted biodegradable amphiphilic triblock copolymer poly(glutamic acid)-b-poly(L-lactide)-b-poly(glutamic acid): Synthesis and self-assembly, *J. Polym. Sci. Part A: Polym. Chem.* 45:3218-3230.

Dror, Y., Ziv, T., Makarov, V., Wolf, H., Admon, A. and Zussman, E. (2008) Nanofibers made of globular proteins, *Biomacromolecules* 9:2749-2754.

Gibson, M. I. and Cameron, N. R. (2009) Experimentally facile controlled polymerization of N-carboxyanhydrides (NCAs), including O-benzyl-L-threonine NCA, *J. Polym. Sci. Part A: Polym. Chem.* 47:2882-2891.

Hadjichristidis, N., Iatrou, H., Pitsikalis, M. and Sakellariou, G. (2009) Synthesis of well-defined polypeptide-based materials via the ring-opening polymerization of □-amino acid N-carboxyanhydrides, *Chem. Rev.* 109: 5528-5578.

Haynie, D. T. (2008) Method for controlling stability of nanofabricated polypeptide multilayer films, coatings, and microcapsules, U.S. Pat. No. 7,321,022.

Haynie, D. T. (2008) Nanofabricated polypeptide multilayer films, coatings, and microcapsules, U.S. Pat. No. 7,348,399.

Haynie, D. T. (2009) Immunogenic compositions and methods of use, U.S. Pat. No. 7,615,530.

Haynie, D. T. (2009) Nanofabricated polypeptide multilayer films, coatings, and microcapsules, U.S. Pat. No. 7,534,860.

Haynie, D. T. (2009) Method for controlling stability of nanofabricated polypeptide multilayer films, coatings, and microcapsules, U.S. Pat. No. 7,538,184.

Haynie, D. T. (2009) Multilayer films, coatings, and microcapsules comprising polypeptides, U.S. Pat. No. 7,544,770.

Haynie, D. T. (2009) Multilayer films, coatings, and microcapsules comprising polypeptides, U.S. Pat. No. 7,550,557.

Haynie, D. T. (2010) Immunogenic compositions and methods of use, U.S. Pat. No. 7,781,399.

Haynie, D. T. (2010) Immunogenic compositions and methods of use, U.S. Pat. No. 7,786,076.

Haynie, D. T. (2010) Immunogenic compositions and methods of use, U.S. Pat. No. 7,807,632.

Haynie, D. T. (2010) Immunogenic compositions and methods of use, U.S. Pat. No. 7,807,633.

Haynie, D. T. (2010) Immunogenic compositions and methods of use, U.S. Pat. No. 7,807,634.

Haynie, D. T. (2010) Polypeptide films and methods, U.S. Pat. No. 7,723,294.

Haynie, D. T. (2010) Polypeptide films and methods, U.S. Pat. No. 7,759,305.

Haynie, D. T. and Lvov, Y. (2008) Artificial red blood cells, U.S. Pat. No. 7,411,038.

Haynie, D. T. and Zhi, Z.-L. (2009) Polypeptide films and methods, U.S. Pat. No. 7,662,911.

Huang, L., Nagapudi, K., Apkarian, R. and Chaikof, E. L. (2001a) Effect of water-soluble polymers on naproxen complexation with natural and chemically modified beta-cyclodextrins, *Scanning* 23:372-377.

Huang, L., Nagapudi, K., Apkarian, R. and Chaikof, E. L. (2001b) Engineered collagen-PEO nanofibers and fabrics, *J. Biomater. Sci. Polym. Edn* 12:979-994.

Huang et al., A review on polymer nanofibers by electrospinning and their applications in nanocomposites, *Comp. Sci. Technol.* 63:2223-2253 (2003).

Huang, Z. M., Zhang, Y. Z., Ramakrishna, S. and Lim, C. T. (2004) Electrospinning and mechanical characterization of gelatin nanofibers, *Polymer* 45:5361-5368.

Jin, H.-J., Fridrikh, S. V., Rutledge, G. C. and Kaplan, D. L. (2002) Electrospinning *Bombyx mori* silk with poly(ethylene oxide), *Biomacromolecules* 3:1233-1239.

Kamei, Y., Sudo, A. and Endo, T. (2008) Synthesis of polypeptide having defined terminal structures through polymerization of activated urethane-derivative of □-Benzyl-L-glutamate, *Macromolecules* 41:7913-7919.

Khadka, D. B. and Haynie, D. T. (2010) Insoluble synthetic polypeptide mats from aqueous solution by electrospinning, *ACS Appl. Mater. Interfaces*, DOI: 10.1021/am 1006657.

Kricheldorf, H. (2006) Polypeptides and 100 years of chemistry of L-amino acid N-carboxyanhydrides, *Angew. Chem., Int. Ed.* 45:5752-5784.

Kricheldorf, H. R., Lossow, C. and Schwarz, G. (2005) Cyclic polypeptides by solvent-induced polymerizations of ☐-amino acid N-carboxyanhydrides. *Macromolecules* 38:5513-5518.

Maham, A., Tang, Z., Wu, H., Wang, J. and Lin, Y. (2009) Protein-based nanomedicine platforms for drug delivery, *Small* 5:1317-1331.

Matthews, J. A., Simpson, D. G., Wnek, G. E. and Bowlin, G. L. (2002) Electrospinning of collagen nanofibers, *Biomacromolecules* 3:232-238.

Sekiguchi, H. (1981) Mechanism of N-carboxy-α-amino acid anhydride (NCA) polymerization, *Pure Appl. Chem.* 53:1689-1714.

Sill, T. J. and von Recum, H. A. (2008) Electrospinning: applications in drug delivery and tissue engineering, *Biomaterials* 29:1989-2006.

Szwarc, M. (1965) The kinetics and mechanism of N-carboxy-α-amino acid anhydride polymerization to polyamino acids, *Fortschritte der Hochpolymeren-Forschung (Adv. Polm. Sci.)* 4:1-65.

Wimley, W. C., Creamer, T. C. and White, S. H. (1996) Solvation energies of amino acid side chains and backbone in a family of host-guest pentapeptides, *Biochemistry* 35:5109-5124.

Wnek, G. E., Carr, M. E., Simpson, D. G. and Bowlin, G. L. (2003) Electrospinning of nanofiber fibrinogen structures, *Nano Lett.* 3:213-216.

Xie, J. and Hsieh, Y.-L. (2003) Ultra-high surface fibrous membranes from electrospinning of natural proteins: casein and lipase enzyme, *Mater. Sci.* 38:2125-2133.

Zhang, Y., Ouyang, H., Lim, C. T., Ramakrishna, S. and Huang, Z.-M. (2005) Electrospinning of gelatin fibers and gelatin/PCL composite fibrous scaffolds, *J. Biomed. Mater. Res.* 72B:156-165.

Zhou, C., Qi, X., Li, P., Chen, W. N., Mouad, L., Chang, M. W., Su Jan Leong, S. and Chan-Park, M. B. (2010) High potency and broad-spectrum antimicrobial peptides synthesized via ring-opening polymerization of α-amino-acid-N-carboxyanhydrides, *Biomacromolecules* 11:60-67.

---

We claim:

1. A method of preparing an electrospun nanofibril, comprising:

dissolving at least one polypeptide in a solvent to form a solution; and electrospinning the solution to form the electrospun nanofibril, wherein the at least one polypeptide is a random copolymer, wherein a first monomer of the random copolymer is ornithine, and wherein a second monomer of the random copolymer is lysine, alanine, glycine, proline, valine, or serine.

2. The method according to claim 1, wherein a diameter of the nanofibril is less than a micron.

3. The method according to claim 1, wherein electrospinning the solution comprises electrospinning the solution in an electric field of from about $10^2$ V/m to about $7 \times 10^5$ V/m.

4. The method according to claim 1, wherein the solvent is water.

5. The method according to claim 1, wherein the at least one polypeptide is present in the solution at a concentration in a range of from 10% to 55% (w/v).

6. The method according to claim 1, wherein the at least one polypeptide is present in the solution at a concentration in a range of from about 50% to about 55% (w/v).

7. The method according to claim 5, wherein the at least one polypeptide is dissolved in the solvent at a temperature in a range of from 20° C. to 30° C.

8. The method according to claim 7, wherein the solvent is water.

9. The method according to claim 1, wherein the at least one polypeptide satisfies the opposite charges criterion.

10. The method according to claim 1, wherein electrospinning the solution comprises continuously electrospinning the solution at a flow rate in a range of from 1 μL/min to 100 μL/min.

11. The method according to claim 8, wherein electrospinning the solution comprises continuously electrospinning the solution at a flow rate in a range of from 1 μL/min to 100 μL/min.

12. The method according to claim 11, wherein the at least one polypeptide satisfies the following equation: (non-polar surface area−polar surface area)/DP<100 square angstroms/residue, wherein DP is the degree of polymerization of the at least one polypeptide, wherein the at least one polypeptide satisfies the opposite charges criterion, and wherein the degree of polymerization of the at least one polypeptide is at least 25.

13. The method according to claim 1, wherein the degree of polymerization of the at least one polypeptide is at least 25.

14. The method according to claim 1, wherein the at least one polypeptide satisfies the following equation: (non-polar surface area−polar surface area)/DP<100 square angstroms/residue, wherein DP is the degree of polymerization of the at least one polypeptide.

* * * * *

UNITED STATES PATENT AND TRADEMARK OFFICE
CERTIFICATE OF CORRECTION

PATENT NO. : 9,963,805 B2
APPLICATION NO. : 15/243423
DATED : May 8, 2018
INVENTOR(S) : Donald T. Haynie and Lei Zhai Page 1 of 1

It is certified that error appears in the above-identified patent and that said Letters Patent is hereby corrected as shown below:

In the Specification

Column 3,
Line 38, "50%0, (w/v)." should read --50% (w/v).--.

Column 19,
Line 11, "(?30 kDa)," should read --(≥30 kDa),--.

Column 24,
Line 4, "was -$10^3$" should read --was ~$10^3$--.

Column 27,
Line 64, "of 4 cm-t" should read --of 4 $cm^{-1}$--.

Column 32,
Line 42, "N-CBz-lysine-NCA" should read --$N^\varepsilon$-CBz-lysine-NCA--.

Signed and Sealed this
Fifth Day of March, 2019

Andrei Iancu
*Director of the United States Patent and Trademark Office*

SEQUENCE LISTING

```
<160> NUMBER OF SEQ ID NOS: 8

<210> SEQ ID NO 1
<211> LENGTH: 5
<212> TYPE: PRT
<213> ORGANISM: Artificial Sequence
<220> FEATURE:
<223> OTHER INFORMATION: amino acid sequence of V*

<400> SEQUENCE: 1

Val Pro Gly Val Gly
1               5

<210> SEQ ID NO 2
<211> LENGTH: 25
<212> TYPE: PRT
<213> ORGANISM: Artificial Sequence
<220> FEATURE:
<223> OTHER INFORMATION: amino acid sequence of C*

<400> SEQUENCE: 2

Val Pro Gly Val Gly Val Pro Gly Val Gly Val Pro Gly Cys Gly Val
1               5                   10                  15

Pro Gly Val Gly Val Pro Gly Val Gly
            20                  25

<210> SEQ ID NO 3
<211> LENGTH: 11
<212> TYPE: PRT
<213> ORGANISM: Artificial Sequence
<220> FEATURE:
<223> OTHER INFORMATION: partial amino acid sequence of chimeric protein
      Lalpha-V*40C*2

<400> SEQUENCE: 3

Ile Lys Val Ala Val Gly Gly Gly Gly Gly Cys
1               5                   10

<210> SEQ ID NO 4
<211> LENGTH: 11
<212> TYPE: PRT
<213> ORGANISM: Artificial Sequence
<220> FEATURE:
```

<223> OTHER INFORMATION: partial amino acid sequence of chimeric protein
    Lbeta-V*40C*2

<400> SEQUENCE: 4

Tyr Ile Gly Ser Arg Gly Gly Gly Gly Cys
1               5                   10

<210> SEQ ID NO 5
<211> LENGTH: 9
<212> TYPE: PRT
<213> ORGANISM: Artificial Sequence
<220> FEATURE:
<223> OTHER INFORMATION: partial amino acid sequence of chimeric protein
    FN-V*40C*2

<400> SEQUENCE: 5

Arg Gly Asp Gly Gly Gly Gly Gly Cys
1               5

<210> SEQ ID NO 6
<211> LENGTH: 21
<212> TYPE: PRT
<213> ORGANISM: Artificial Sequence
<220> FEATURE:
<223> OTHER INFORMATION: partial amino acid sequence of chimeric protein
    CI-2-V*40C*2

<400> SEQUENCE: 6

Gly Thr Pro Gly Pro Gln Gly Ile Ala Gly Gln Arg Gly Val Val Gly
1               5                   10                  15

Gly Gly Gly Gly Cys
            20

<210> SEQ ID NO 7
<211> LENGTH: 20
<212> TYPE: PRT
<213> ORGANISM: Artificial Sequence
<220> FEATURE:
<223> OTHER INFORMATION: partial amino acid sequence of chimeric protein
    CIV-V*40C*2

<400> SEQUENCE: 7

Gly Glu Phe Tyr Phe Asp Leu Arg Leu Lys Gly Asp Lys Tyr Gly Gly
1               5                   10                  15

Gly Gly Gly Cys
            20

<210> SEQ ID NO 8
<211> LENGTH: 19
<212> TYPE: PRT
<213> ORGANISM: Artificial Sequence
<220> FEATURE:
<223> OTHER INFORMATION: partial amino acid sequence of chimeric protein
    MSH-V*40C*2

<400> SEQUENCE: 8

Ser Tyr Ser Met Glu His Phe Arg Trp Gly Lys Pro Val Gly Gly
1               5                   10                  15

Gly Gly Cys